(12) United States Patent
Uchimura

(10) Patent No.: US 10,566,027 B2
(45) Date of Patent: Feb. 18, 2020

(54) INFORMATION PROCESSING APPARATUS AND INFORMATION PROCESSING METHOD

(71) Applicant: SONY CORPORATION, Tokyo (JP)

(72) Inventor: Kouichi Uchimura, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/073,991

(22) PCT Filed: Feb. 6, 2017

(86) PCT No.: PCT/JP2017/004160
§ 371 (c)(1),
(2) Date: Jul. 30, 2018

(87) PCT Pub. No.: WO2017/141745
PCT Pub. Date: Aug. 24, 2017

(65) Prior Publication Data
US 2019/0043535 A1    Feb. 7, 2019

(30) Foreign Application Priority Data

Feb. 19, 2016  (JP) ................................. 2016-029923

(51) Int. Cl.
| | |
|---|---|
| *G11B 27/19* | (2006.01) |
| *G11B 27/34* | (2006.01) |
| *G09G 5/00* | (2006.01) |
| *G11B 27/10* | (2006.01) |
| *H04N 5/775* | (2006.01) |
| *H04N 21/436* | (2011.01) |
| *H04N 9/79* | (2006.01) |

(Continued)

(52) U.S. Cl.
CPC ............. *G11B 27/19* (2013.01); *G09G 5/005* (2013.01); *G09G 5/006* (2013.01); *G11B 27/34* (2013.01)

(58) Field of Classification Search
CPC ............ H04N 5/77; H04N 5/765; H04N 5/85; H04N 21/42646; H04N 5/781;
(Continued)

(56) References Cited

U.S. PATENT DOCUMENTS

2005/0111832 A1   5/2005  Okauchi et al.
2007/0147794 A1*  6/2007  Araki .................... G11B 20/10
                                                       386/332

(Continued)

FOREIGN PATENT DOCUMENTS

AU      2014282416 A1   12/2015
CA         2914978 A1   12/2014
(Continued)

OTHER PUBLICATIONS

International Search Report and Written Opinion of PCT Application No. PCT/JP2017/004160, dated Mar. 21, 2017, 10 pages of ISRWO.

*Primary Examiner* — Hung Q Dang
(74) *Attorney, Agent, or Firm* — Chip Law Group

(57) ABSTRACT

An information processing apparatus generates index information including entire information and individual information, the entire information being information related to an entire recording medium as a recording destination of content including at least video data, the entire information including at least any of information related to resolution of video of the content recorded in the recording medium, information related to a codec, and information related to a luminance range, the individual information being information related to each of pieces of content recorded in the recording medium, the individual information including at least any of information related to resolution of video, information related to a codec, and information related to a luminance range, and then, controls to record the generated index information onto the recording medium.

12 Claims, 21 Drawing Sheets

(51) Int. Cl.
  *G09G 5/10* (2006.01)
  *H04N 9/82* (2006.01)
  *H04N 9/804* (2006.01)
  *H04N 5/781* (2006.01)
  *G11B 27/32* (2006.01)
  *G11B 20/10* (2006.01)

(58) Field of Classification Search
  CPC .... H04N 9/8042; H04N 5/775; H04N 9/8227;
         H04N 5/772; H04N 9/7921; H04N
         9/8205; H04N 19/44; H04N 9/8063;
         H04N 19/98; H04N 1/4072; H04N
         19/597; H04N 5/445; H04N 21/4325;
         H04N 5/2355; H04N 5/235; H04N
         1/6027; G09G 2370/04; G09G 2340/10;
         G06T 2207/20221; G06T 5/50
  USPC .................................. 386/230–232, 239–248
  See application file for complete search history.

(56) References Cited

U.S. PATENT DOCUMENTS

2016/0134832 A1    5/2016  Yamamoto et al.
2016/0142714 A1*   5/2016  Toma ................. H04N 21/4402
                                                    375/240.25
2016/0150180 A1*   5/2016  Kozuka ................ H04N 5/913
                                                    386/254
2016/0173846 A1    6/2016  Uchimura et al.
2016/0269676 A1    9/2016  Yamamoto et al.
2017/0018292 A1*   1/2017  Yahata ................ H04N 9/8042

FOREIGN PATENT DOCUMENTS

| | | |
|---|---|---|
| CA | 2916577 A1 | 1/2015 |
| CN | 105284106 A | 1/2016 |
| CN | 105359543 A | 2/2016 |
| EP | 3013040 A1 | 4/2016 |
| EP | 3022939 A1 | 5/2016 |
| JP | 2005-303977 A | 10/2005 |
| JP | 2015-022775 A | 2/2015 |
| JP | 2015-225495 A | 12/2015 |
| KR | 10-2016-0022305 A | 2/2016 |
| KR | 10-2016-0032044 A | 3/2016 |
| MX | 2015017079 A | 3/2016 |
| MX | 2016000029 A | 3/2016 |
| TW | 201509191 A | 3/2015 |
| TW | 201523575 A | 6/2015 |
| WO | 2014/203746 A1 | 12/2014 |
| WO | 2015/008448 A1 | 1/2015 |

* cited by examiner

FIG. 4

| INDEX.BAV() { | No. of bits | Mnemonic | |
|---|---|---|---|
| type_indicator | 8*4 | bslbf | ENTIRE MEDIUM INFORMATION |
| version_number | 8*4 | bslbf | |
| 4K_content_exist_flag | 1 | bslbf | |
| 8K_content_exist_flag | 1 | bslbf | |
| HEVC_content_exist_flag | 1 | bslbf | |
| HDR_content_exit_flag | 1 | bslbf | |
| ... | | | |
| number_of_titles | 16 | uimsbf | |
| for (k=0; i<number_of_titles; k++) { | | | |
| MP4_info() { | | | INDIVIDUAL MP4 INFORMATION |
| ... | | | |
| is_4K_content_flag | 1 | bslbf | |
| is_8K_content_flag | 1 | bslbf | |
| is_HEVC_content_flag | 1 | bslbf | |
| HDR_type_flag | 16 | bslbf | |
| } | | | |
| } | | | |

FIG. 5

| INDEX.BAV() { | No. of bits | Mnemonic | |
|---|---|---|---|
| type_indicator | 8*4 | bslbf | ENTIRE MEDIUM INFORMATION |
| version_number | 8*4 | bslbf | |
| 4K_content_exist_flag | 1 | bslbf | |
| 8K_content_exist_flag | 1 | bslbf | |
| HEVC_content_exist_flag | 1 | bslbf | |
| HDR_content_exit_flag | 16 | bslbf | |
| ... | | | |
| number_of_titles | 16 | uimsbf | |
| for (k=0; i<number_of_titles; k++) { | | | |
|   PlayList_info() { | | | INDIVIDUAL PlayList INFORMATION |
|   ... | | | |
|   is_4K_content_flag | 1 | bslbf | |
|   is_8K_content_flag | 1 | bslbf | |
|   is_HEVC_content_flag | 1 | bslbf | |
|   HDR_type_flag | 16 | bslbf | |
|   } | | | |
| } | | | |

FIG. 18

THERE IS CONTENT INCLUDING VIDEO THAT CANNOT BE DISPLAYED IN ORIGINAL IMAGE QUALITY

TO DISPLAY VIDEO IN ORIGINAL IMAGE QUALITY, DISPLAY OF 8K RESOLUTION OR MORE IS NEEDED

FIG. 19

TITLE LIST

4K CONTENT — 201

| TITLE | RECORDED DATE AND TIME | | BROADCAST STATION | GENRE |
|---|---|---|---|---|
| PROGRAM A | 7/1 | 13:00-16:00 | 7ch | DOCUMENTARY |
| PROGRAM B | 6/29 | 11:00-12:00 | 1ch | NEWS |
| PROGRAM C | 6/20 | 14:00-18:00 | 3ch | SPORTS |
| PROGRAM D | 6/15 | 13:00-16:00 | 7ch | VARIETY SHOWS |
| PROGRAM E | 6/1 | 17:00-19:00 | 9ch | DOCUMENTARY |

FIG. 20

RECORDING MEDIUM RECORDING 4K CONTENT
: RECORDING MEDIUM A

RECORDING MEDIUM RECORDING HDR CONTENT (TYPE 1)
: RECORDING MEDIUM A AND RECORDING MEDIUM B

FIG. 21

TITLE LIST

| TITLE | RECORDED DATE AND TIME | | BROADCAST STATION | GENRE | RESOLUTION |
|---|---|---|---|---|---|
| PROGRAM A | 7/1 | 13:00-16:00 | 7ch | DOCUMENTARY | 4K |
| PROGRAM B | 6/29 | 11:00-12:00 | 1ch | NEWS | 4K |
| PROGRAM C | 6/20 | 14:00-18:00 | 3ch | SPORTS | 8K |
| PROGRAM D | 6/15 | 13:00-16:00 | 7ch | VARIETY SHOWS | 8K |
| PROGRAM E | 6/1 | 17:00-19:00 | 9ch | DOCUMENTARY | 4K | ns
INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2017/004160 filed on Feb. 6, 2017, which claims priority benefit of Japanese Patent Application No. JP 2016-029923 filed in the Japan Patent Office on Feb. 19, 2016. Each of the above-referenced applications is hereby incorporated herein by reference in its entirety.

TECHNICAL FIELD

The present technology relates to an information processing apparatus, an information processing method, and a program, and more particularly relates to an information processing apparatus, an information processing method, and a program capable of specifying attributes of all content recorded in a recording medium, together with attributes of individual content.

BACKGROUND ART

SeeQVault (registered trademark) is a standard for protecting content recorded in a general-purpose recording medium such as a memory card or an external hard disk. SeeQVault is a standard provided by Next Generation Secure Memory Initiative (NSM) as a standards body.

Content recorded in a SeeQVault compliant recording medium by a SeeQVault compliant electronic device is reproducible on another SeeQVault compliant electronic device to which the recording medium is connected.

CITATION LIST

Patent Document

Patent Document 1: Japanese Patent Application Laid-Open No. 2015-225495

SUMMARY OF THE INVENTION

Problems to be Solved by the Invention

In recent years, broadcasting content with ultra high definition (UHD) resolution higher than HD resolution (1920×1080 pixels) or recording such content on a large capacity recording medium such as Blu-ray (registered trademark) disc is achieved in part. As SeeQVault, discussion is ongoing to make it possible to handle content with UHD resolution.

The present technology has been provided in view of such a situation, and aims to specify attributes of all content recorded in a recording medium together with attributes of individual content.

Solutions to Problems

An information processing apparatus according to an aspect of the present technology includes: a generation unit configured to generate index information including entire information and individual information, the entire information being information related to an entire recording medium as a recording destination of content including at least video data, the entire information including at least any of information related to resolution of video of the content recorded in the recording medium, information related to a codec, and information related to a luminance range, the individual information being information related to each of pieces of content recorded in the recording medium, the individual information including at least any of information related to resolution of video, information related to a codec, and information related to a luminance range; and a recording control unit that controls to record content as a recording target and the index information onto the recording medium.

It is possible to cause the generation unit to generate information indicating whether at least one piece of content including video with resolution higher than HD is recorded in the recording medium as the information related to resolution included in the entire information and generate information indicating whether the content is content including video with resolution higher than HD as the information related to resolution included in the individual information.

It is possible to cause the generation unit to generate information indicating whether at least one piece of content including video coded with a predetermined codec is recorded in the recording medium as the information related to a codec included in the entire information and generate information indicating whether the content is content including video coded with a predetermined codec as the information related to a codec included in the individual information.

It is possible to cause the generation unit to generate information indicating whether at least one piece of HDR content is recorded in the recording medium as the information related to a luminance range included in the entire information and generate information indicating one type of HDR video as the information related to a luminance range included in the individual information.

It is possible to cause the generation unit to delete the individual information related to predetermined content recorded in the recording medium and rewrite the entire information, in accordance with erasing of the predetermined content.

It is possible to cause the generation unit to rewrite the information related to resolution of video included in the entire information in a case where content including video having the same resolution the predetermined content does not exist in the recording medium, rewrite the information related to a codec included in the entire information in a case where content including video coded with the same codec as the predetermined content does not exist in the recording medium, and rewrite the information related to a luminance range included in the entire information in a case where content including HDR video of the same type as the predetermined content does not exist in the recording medium.

According to an aspect of the present technology, index information including entire information and individual information are generated, the entire information being information related to an entire recording medium as a recording destination of content including at least video data, the entire information including at least any of information related to resolution of video of the content recorded in the recording medium, information related to a codec, and information related to a luminance range, the individual information being information related to each of pieces of content recorded in the recording medium, the individual information including at least any of information related to resolution of video, information related to a codec, and information related to a luminance range, and then content as a recording target and the index information are recorded onto the recording medium.

An information processing apparatus according to another aspect of the present technology includes: a reading unit configured to read, from a recording medium in which content including at least video data is recorded, index information including entire information and individual information, the entire information being information related to an entire recording medium, the entire information including at least any of information related to resolution of video of the content recorded in the recording medium, information related to a codec, and information related to a luminance range, the individual information being information related to each of pieces of content recorded in the recording medium, the individual information including at least any of information related to resolution of video, information related to a codec, and information related to a luminance range; and a display control unit that displays information indicating that content including video that cannot be displayed in original image quality on a display apparatus as a content output destination is recorded in the recording medium on the basis of the entire information, and displays information indicating an attribute of each of pieces of content recorded in the recording medium on the basis of the individual information.

It is possible to cause the display control unit to display the information indicating that content including video that cannot be displayed in original image quality is recorded in the recording medium in a case where the content recorded in the recording medium includes one or more of: content including video with resolution that cannot be displayed on the display apparatus; content including video coded with a codec that cannot be decoded; and content including video having a luminance range that cannot be displayed on the display apparatus.

According to another aspect of the present technology, index information including entire information and individual information is read from a recording medium in which content including at least video data is recorded, the entire information being information related to an entire recording medium, the entire information including at least any of information related to resolution of video of the content recorded in the recording medium, information related to a codec, and information related to a luminance range, the individual information being information related to each of pieces of content recorded in the recording medium, the individual information including at least any of information related to resolution of video, information related to a codec, and information related to a luminance range, then information indicating that content including video that cannot be displayed in original image quality on a display apparatus as a content output destination is recorded in the recording medium is displayed on the basis of the entire information and information indicating an attribute of each of pieces of content recorded in the recording medium is displayed on the basis of the individual information.

Effects of the Invention

According to the present technology, it is possible to specify attributes of all content recorded on a recording medium together with attributes of individual content.

Note that effects described herein are non-limiting. The effects may be any effects described in the present disclosure.

BRIEF DESCRIPTION OF DRAWINGS

FIG. 4 is a diagram illustrating an example of syntax of an INDEX file in recording content in an MP4 file format.

FIG. 5 is a diagram illustrating an example of syntax of an INDEX file in recording content in the TS Recording file format.

FIG. 18 is a diagram illustrating a display example of a display unit.

FIG. 19 is a diagram illustrating a display example of a title list.

FIG. 20 is a diagram illustrating another display example of a display unit.

FIG. 21 is a diagram illustrating still another display example of a display unit.

MODE FOR CARRYING OUT THE INVENTION

Hereinafter, embodiments of the present technology will be described. Description will be presented in the following order.

1. Information processing system
2. SeeQVault
3. Configuration example of recording apparatus and reproducing apparatus
4. Operation example of recording apparatus and reproducing apparatus
5. Modification <<1. Information Processing System>>

Figure 1:
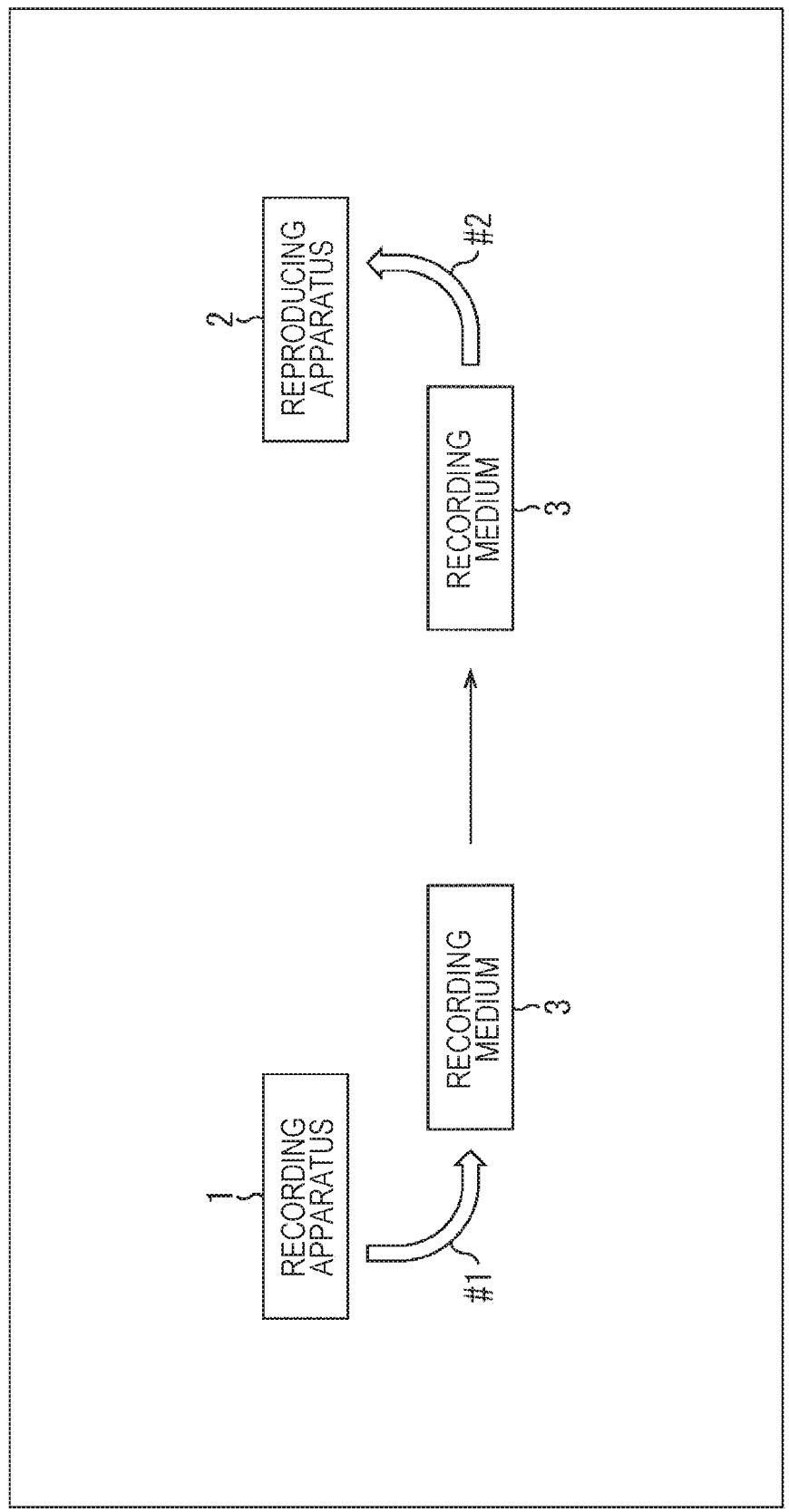
FIG. 1 is a diagram illustrating a configuration example of an information processing system according to an embodiment of the present technology.

FIG. 1 is a diagram illustrating a configuration example of an information processing system according to an embodiment of the present technology.

The information processing system of FIG. 1 includes a recording apparatus 1 and a reproducing apparatus 2.

The recording apparatus 1 is an information processing apparatus such as a hard disk recorder, a television receiver, a personal computer, or the like. The recording apparatus 1 has a function of obtaining and recording content such as broadcast content and content delivered via a network such as the Internet.

An example of content obtained by the recording apparatus 1 is a television program including video and audio. As long as the content includes at least video, any type of content may be obtained by the recording apparatus 1.

The reproducing apparatus 2 is a stationary information processing apparatus such as a hard disk recorder, a media player, and a television receiver. The reproducing apparatus 2 may be a portable information processing apparatus such as a smartphone or a tablet terminal. The reproducing apparatus 2 reproduces the content and outputs video and audio of the content.

In a case where the reproducing apparatus 2 is an apparatus without a display, such as a hard disk recorder and a media player, the video of the content reproduced by the reproducing apparatus 2 is displayed on an external display connected to the reproducing apparatus 2. Moreover, in a case where the reproducing apparatus 2 is an apparatus with a display, such as a television receiver, a portable information processing apparatus, the video of the content reproduced by the reproducing apparatus 2 is displayed on a display possessed by the reproducing apparatus 2.

A recording medium 3 is a general-purpose recording medium such as a memory card conforming to a predetermined standard such as the SD standard, a universal serial bus (USB) memory, an external hard disk drive (HDD) connected via USB, and a solid state drive (SSD). The recording medium 3 can be attached to and detached from the recording apparatus 1 and the reproducing apparatus 2. An optical disc such as a Blu-ray (registered trademark) disc may be used as the recording medium 3.

The recording apparatus 1, the reproducing apparatus 2, and the recording medium 3 are apparatuses each being compliant with SeeQVault (registered trademark), which is a content protection standard. As illustrated by a hollow arrow #1, content recorded in the recording medium 3 by the recording apparatus 1 can be reproduced on the reproducing apparatus 2 as illustrated by a hollow arrow #2 by re-attaching the recording medium 3 on the reproducing apparatus 2.

Now, a flow of content recording by the recording apparatus 1 and content reproduction by the reproducing apparatus 2 will be briefly described.

The recording apparatus 1 authenticates the recording medium 3 to generate an encryption key used for content encryption, and records the key onto a protected region of the recording medium 3. Moreover, the recording apparatus 1 records the content encrypted using the encryption key onto the recording medium 3.

The reproducing apparatus 2 authenticates the connected recording medium 3 to obtain an encryption key (decryption key) from the protected region of the recording medium 3. In addition, the reproducing apparatus 2 reads the encrypted content from the recording medium 3 and decrypts it using the decryption key. The reproducing apparatus 2 decodes a video stream and an audio stream of the content obtained by decryption, and respectively outputs the streams as video and audio.

The information processing system of FIG. 1 is capable of processing UHD video content, HDR video content, and HEVC-coded video content.

That is, the recording apparatus 1 can record UHD video content or the like onto the recording medium 3 being a recording medium compliant with SeeQVault. The reproducing apparatus 2 can reproduce the UHD video content supplied via the recording medium 3 and display the video on the display. With the conventional SeeQVault standard, handling UHD video content, HDR video content, and HEVC-coded video content is disabled.

Ultra high definition (UHD) video is video with resolution higher than HD (2K (1920×1080 pixels)). For example, UHD video includes 4K video with resolution of 4K (3840×2160 pixels), that is, four times the number of pixels of HD, and 8K video with resolution of 8K (7680×4320 pixels), that is, eight times the number of pixels of HD.

High dynamic range (HDR) video is video having a dynamic range (luminance range) wider than the dynamic range of standard dynamic range (SDR) video that can be displayed on a standard luminance display. The maximum luminance of the standard luminance display is 100 cd/m2 (=100 nits), for example. The maximum luminance of the HDR video is 1000 nits, for example, higher than the standard luminance.

The HDR video has a plurality of HDR types being set such as type 1, type 2, type 3, and so on. Each of the HDR types has different specifications such as maximum luminance and parameters used for gradation conversion. For example, the HDR video with an HDR type 1 can be displayed on a display compatible with HDR video of type 1. HDR video images with HDR type of type 2 or type 3 can be displayed on displays corresponding to HDR video of type 2 and type 3, respectively.

High Efficiency Video Coding (HEVC) is a video compression scheme (coding scheme), and has higher compression efficiency than H.264/MPEG-4 Advanced Video Coding (AVC).

In this manner, SeeQVault with which each of devices of the information processing system of FIG. 1 is compliant can be said to be a standard obtained by expanding the conventional SeeQVault standard. With capability of handling content of the UHD video or the like, INDEX information (index information), that is, management information of the content recorded in the recording medium 3 is also expanded. As described below, the INDEX information is information recorded in the recording medium 3 together with the content data. The reproducing apparatus 2 can specify the attribute of the content recorded in the recording medium 3 on the basis of the INDEX information.

<<2. SeeQVault>>

Now, SeeQVault with which each of devices of the information processing system of FIG. 1 is compliant will be described.

SeeQVault defines an MP4 file format (NSM mp4 file format) and a TS Recording file format (NSM TS Recording file format) as file formats for content managing. The MP4 file format is a format corresponding to the recording of MP4 files, while the TS Recording file format is a format corresponding to the recording of MPEG-2 TS files.

In a case where content is recorded in the MP4 file format, the recording medium 3 records an MP4 file obtained by multiplexing AV streams in addition to an INDEX file as an INDEX information file. One MP4 file corresponds to one piece of content (one title). The recording medium 3 also records reproduction control information of each of the MP4 files.

In contrast, in a case where content is recorded in the TS Recording file format, the recording medium 3 records a TS file obtained by multiplexing the AV streams as MPEG-2 TS, a PlayList file as reproduction control information, and the like, in addition to the INDEX file. The PlayList file contains information of a TS file to be reproduced, information of a reproduction section of the AV stream, and the like. The TS file and the PlayList file are associated with each other, and one PlayList file corresponds to one piece of content (one title).

<2-1. Example of Directory Structure>

Figure 2:
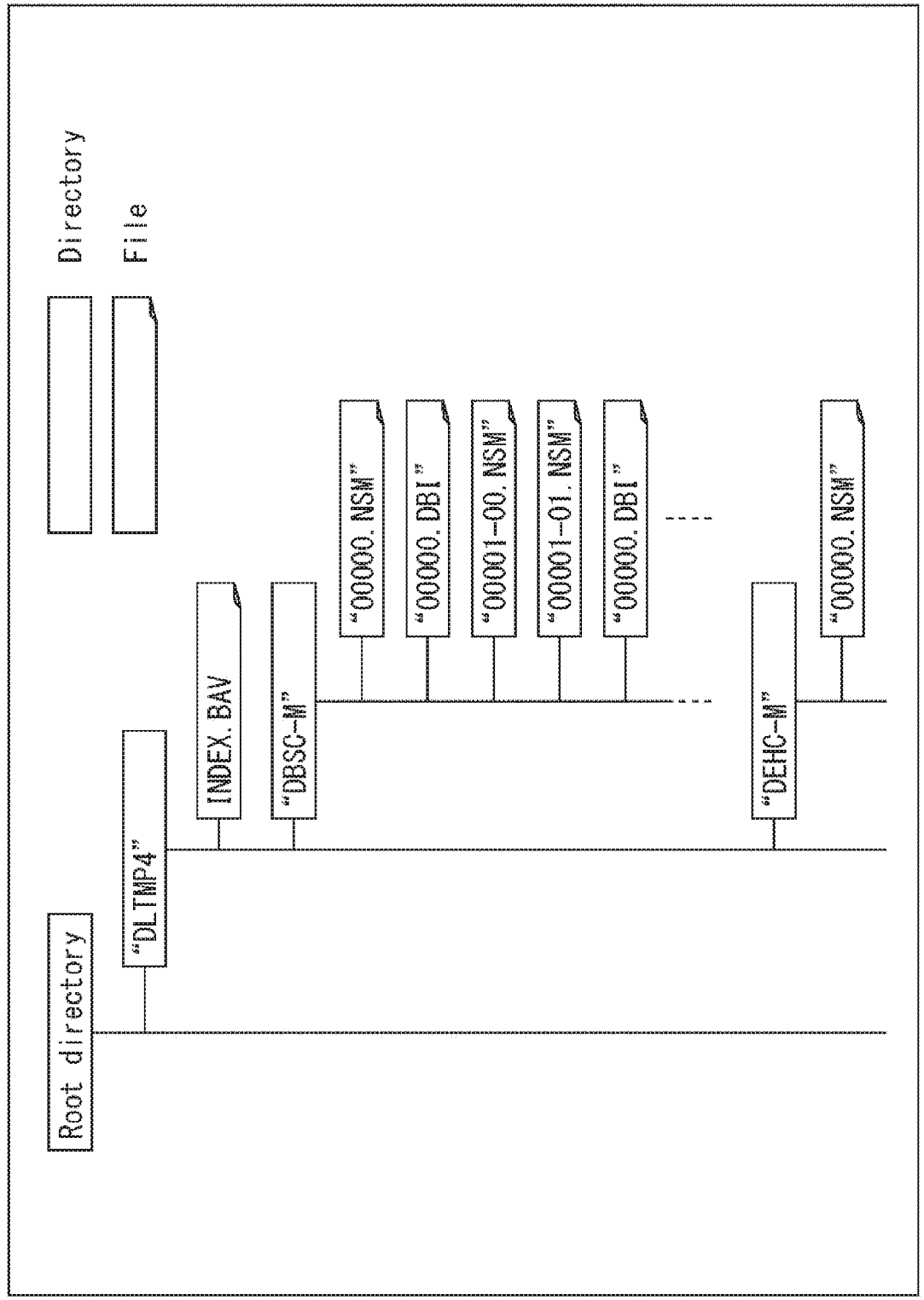
FIG. 2 is a diagram illustrating an exemplary file management structure in an MP4 file format.

FIG. 2 is a diagram illustrating an exemplary file management structure in the MP4 file format.

Each of files is hierarchically managed by a directory structure. A root directory (Root directory) is created in the recording medium 3. A DLTMP4 directory is created under the root directory.

One INDEX file set with the name "INDEX.BAV" is stored under the DLTMP4 directory. The INDEX file contains description of information related to the entire MP4 files recorded in the recording medium 3 and information related to the individual MP4 files.

The DBSC-M directory and the DBHC-M directory are created under the DLTMP4 directory, and the MP4 files, a reproduction control information file or the like are stored under each of the directories.

Figure 3:
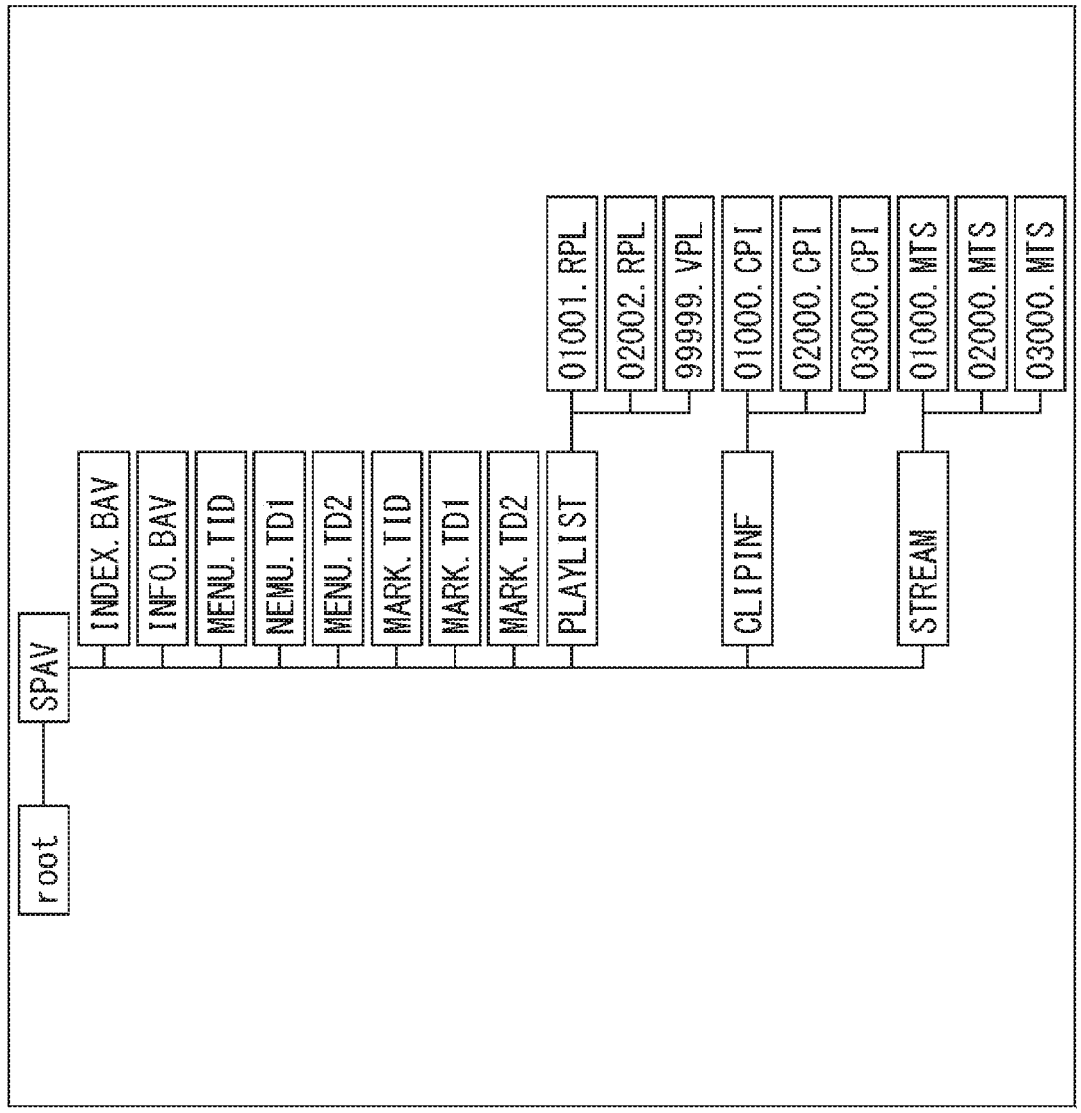
FIG. 3 is a diagram illustrating an exemplary file management structure in a TS Recording file format.

FIG. 3 is a diagram illustrating an exemplary file management structure in the TS Recording file format.

Each of files is hierarchically managed by a directory structure. A root directory (root) is created in the recording medium 3. A SPAV directory is created under the root directory.

One INDEX file set with the name "INDEX.BAV" is stored under the SPAV directory. The INDEX file contains description of information related to the entire PlayLists recorded in the recording medium 3 and information related to the individual PlayLists.

A PLAYLIST directory, a CLIPINF directory, and a STREAM directory are created under the SPAV directory, with a PlayList file, a Clipinfo file, a TS file, or the like, being stored under each of the directories. The Clipinfo file is also reproduction control information used for reproducing the TS.

In this manner, the recording medium 3 stores one INDEX file either in the case of recording the content in the MP4 file format or the case of recording the content in the TS Recording file format.

<2-2. Example of Syntax of INDEX File>

FIG. 4 is a diagram illustrating an example of syntax of the INDEX file in recording content in the MP4 file format.

FIG. 4 illustrates part of information of the INDEX file. Information from type_indicator to number_of_titles is information related to the entire MP4 files (entire medium information) recorded in the recording medium 3. In addition, information included in MP4_info ( ) is information (individual information) related to individual MP4 files.

type_indicator indicates the type of the INDEX file; version_number indicates the version of the INDEX file.

The entire medium information includes the following information.

4K_content_exist_flag (1 bit)
8K_content_exist_flag (1 bit)
HEVC_content_exist_flag (1 bit)
HDR_content_exit_flag (16 bits)

4K_content_exist_flag of the entire medium information indicates whether at least one piece of 4K content (content including 4K video) is recorded in the recording medium. For example, when the value of 4K_content_exist_flag is 1, this indicates that at least one piece of 4K content is included. In contrast, when the value of 4K_content_exist_flag is 0, this indicates that no 4K content is included.

8K_content_exist_flag of the entire medium information indicates whether at least one piece of 8K content (content including 8K video) is recorded in the recording medium. For example, when the value of 8K_content_exist_flag is 1, this indicates that at least one piece of 8K content is included. In contrast, when the value of 8K_content_exist_flag is 0, this indicates that no 8K content is included.

HEVC_content_exist_flag of the entire medium information indicates whether at least one piece of HEVC content (content including HEVC-coded video) is recorded in the recording medium. For example, when the value of HEVC_content_exist_flag is 1, this indicates that at least one piece of HEVC content is included. In contrast, when the value of HEVC_content_exist_flag is 0, this indicates that no HEVC content is included.

HDR_content_exit_flag of the entire medium information is identification information indicating whether at least one piece of corresponding HDR content (content including HDR video) is recorded in the recording medium and indicating what type of HDR content is recorded. For example, four bits (bit 0 to bit 3) are used in order from the least significant bit of the 16 bits. The other bits are reserved bits.

Each of bit 0 to bit 3 is assigned to SDR, HDR type 1, HDR type 2, and HDR type 3, for example. As described above, individual types are set for the HDR. In this example, three types of HDR types, namely, HDR type 1, HDR type 2, and HDR type 3, are defined. With 16 bits of HDR_content_exit_flag, it is possible to identify up to 16 different types of HDR (including SDR).

When bit 0 is 1, this indicates that at least one piece of SDR content (content of SDR video) is recorded, and when bit 0 is 0, this indicates that no SDR content is recorded.

When bit 1 is 1, this indicates that at least one piece of HDR type 1 content (HDR video (type 1) content) is recorded, and when bit 1 is 0, this indicates that no HDR type 1 content is recorded.

When bit 2 is 1, this indicates that at least one piece of HDR type 2 content (HDR video (type 2) content) is recorded, and when bit 2 is 0, this indicates that no HDR type 2 content is recorded.

When bit 3 is 1, this indicates that at least one piece of HDR type 3 content (HDR video (type 3) content) is recorded, and when bit 3 is 0, this indicates that no HDR type 3 content is recorded.

In a case where two or more pieces of content among the SDR content, the HDR type 1 content, the HDR type 2 content, and the HDR type 3 content are recorded in the recording medium, the value of the plurality of bits is set to 1. For example, in a case where at least one piece of SDR content and one piece of HDR type 1 content are recorded, 1 is set for each of bit 0 and 1, and 0 is set for other bits of HDR_content_exit_flag.

number_of_titles indicates the number of MP4 files recorded in the recording medium 3. After number_of_titles, the individual information MP4_info ( ) is repeated as many times as indicated by number_of_titles. For example, MP4_info ( ) of k=0 is individual information of the first MP4 file, and MP4_info ( ) of k=1 is individual information of the second MP4 file.

The individual information includes the following information.

is_4K_content_flag (1 bit)
 is_8K_content_flag (1 bit)
 is_HEVC_content_flag (1 bit)
 HDR_type_flag (16 bits)

The individual information is_4K_content_flag indicates whether the MP4 file (MP4 file corresponding to MP4_info ( ) including is_4K_content_flag) is a 4K content file. For example, when the value of is_4K_content_flag is 1, this indicates that the MP4 file is a 4K content file. In contrast, when the value of is_4K_content_flag is 0, this indicates that the MP4 file is not a 4K content file.

The individual information is_8K_content_flag indicates whether the MP4 file (MP4 file corresponding to MP4_info ( ) including is_8K_content_flag) is a 8K content file. For example, when the value of is_8K_content_flag is 1, this indicates that the MP4 file is a 8K content file. In contrast, when the value of is_8K_content_flag is 0, this indicates that the MP4 file is not a 8K content file. Note that is_8K_content_flag and is_4K_content_flag are exclusively selected, that is, there is no case where both values are set to 1.

The individual information is_HEVC_content_flag indicates whether the MP4 file (MP4 file corresponding to MP4_info ( ) including is_HEVC_content_flag) is an HEVC content file. For example, when the value of is_HEVC_content_flag is 1, this indicates that the MP4 file is an HEVC content file. In contrast, when the value of is_HEVC_content_flag is 0, this indicates that the MP4 file is not an HEVC content file.

The individual information HDR_type_flag is identification information indicating the type of HDR video of the MP4 file (MP4 file corresponding to MP4_info ( ) including HDR_type_flag). In a case where the MP4 file is an SDR content file, HDR_type_flag indicates that this is SDR video.

For example, four bits (bit 0 to bit 3) are used in order from the least significant bit of the 16 bits. The other bits are reserved bits. Each of bit 0 to bit 3 is assigned to SDR, HDR type 1, HDR type 2, and HDR type 3, for example. Unlike HDR_content_exit_flag of the entire medium information, there is no case where 1 is set to a plurality of bits, that is, 1 is exclusively set. HDR_type_flag indicates one type of HDR video.

When bit 0 is 1, this indicates that the MP4 file is an SDR content file, and when bit 0 is 0, this indicates that the MP4 file is not an SDR content file.

When bit 1 is 1, this indicates that the MP4 file is an HDR type 1 content file, and when bit 1 is 0, this indicates that the MP4 file is not an HDR type 1 content file.

When bit 2 is 1, this indicates that the MP4 file is an HDR type 2 content file, and when bit 2 is 0, this indicates that the MP4 file is not an HDR type 2 content file.

When bit 3 is 1, this indicates that the MP4 file is an HDR type 3 content file, and when bit 3 is 0, this indicates that the MP4 file is not an HDR type 3 content file.

In this manner, the INDEX file contains entire medium information related to the entire MP4 files recorded in the recording medium 3 and individual information related to individual MP4 files.

FIG. 5 is a diagram illustrating an example of syntax of an INDEX file in recording content in the TS Recording file format.

FIG. 5 illustrates part of information of the INDEX file. Description overlapping description in FIG. 4 will be omitted as appropriate. Information from type_indicator to number_of_titles is information related to the entire PlayList file (entire medium information) recorded in the recording medium 3. In addition, information included in PlayList_info ( ) is information (individual information) related to individual PlayList files.

The entire medium information includes the following information.

4K_content_exist_flag (1 bit)
 8K_content_exist_flag (1 bit)
 HEVC_content_exist_flag (1 bit)
 HDR_content_exit_flag (16 bits)

The meaning of each of flags is the same as the meaning of each of flags of the entire medium information included in the INDEX file of the MP4 file format.

number_of_titles indicates the number of PlayList files recorded in the recording medium 3. After number_of_titles, the individual information PlayList_info ( ) is repeated as many times as indicated by number_of_titles. For example, PlayList_info ( ) of k=0 is individual information of the first PlayList file, while PlayList_info ( ) of k=1 is individual information of the second PlayList file.

The individual information includes the following information.

is_4K_content_flag (1 bit)
 is_8K_content_flag (1 bit)
 is_HEVC_content_flag (1 bit)
 HDR_type_flag (16 bits)

The individual information is_4K_content_flag indicates whether the PlayList file (PlayList file corresponding to PlayList_info ( ) including is_4K_content_flag) is used for reproducing 4K content. For example, when the value of is_4K_content_flag is 1, this indicates that the content to be reproduced using the PlayList file is 4K content. In contrast, when the value of is_4K_content_flag is 0, this indicates that the content to be reproduced using the PlayList file is not 4K content.

The individual information is_8K_content_flag indicates whether the PlayList file (PlayList file corresponding to PlayList_info ( ) including the is_8K_content_flag) is used for reproducing 8K content. For example, when the value of is_8K_content_flag is 1, this indicates that the content to be reproduced using the PlayList file is 8K content. In contrast, when the value of is_8K_content_flag is 0, this indicates that the content to be reproduced using the PlayList file is not 8K content.

The individual information is_HEVC_content_flag indicates whether the content to be reproduced using the PlayList file (PlayList file corresponding to PlayList_info ( ) including the is_HEVC_content_flag) is HEVC content. For example, when the value of is_HEVC_content_flag is 1, this indicates that the content to be reproduced using the PlayList file is HEVC content. In contrast, when the value of is_HEVC_content_flag is 0, this indicates that the content to be reproduced using the PlayList file is not HEVC content.

The individual information HDR_type_flag is identification information indicating the type of HDR video of content to be reproduced using the PlayList file (PlayList file corresponding to PlayList_info ( ) including the HDR_type_flag). In a case where the content to be reproduced using the PlayList file is SDR content, HDR_type_flag indicates SDR video.

For example, four bits (bit 0 to bit 3) are used in order from the least significant bit of the 16 bits. The other bits are reserved bits. Each of bit 0 to bit 3 is assigned to SDR, HDR type 1, HDR type 2, and HDR type 3, for example. Unlike HDR_content_exit_flag of the entire medium information, there is no case where 1 is set to a plurality of bits, that is, 1 is exclusively set. HDR_type_flag indicates one type of HDR video.

When bit 0 is 1, this indicates that the content to be reproduced using the PlayList file is SDR content. When bit 0 is 0, this indicates that the content to be reproduced by using the PlayList file is not SDR content.

When bit 1 is 1, this indicates that the content to be reproduced using the PlayList file is HDR type 1 content. When bit 1 is 0, this indicates that the content to be reproduced by using the PlayList file is not HDR type 1 content.

When bit 2 is 1, this indicates that the content to be reproduced using the PlayList file is HDR type 2 content. When bit 2 is 0, this indicates that the content to be reproduced by using the PlayList file is not HDR type 2 content.

When bit 3 is 1, this indicates that the content to be reproduced using the PlayList file is HDR type 3 content. When bit 3 is 0, this indicates that the content to be reproduced by using the PlayList file is not HDR type 3 content.

In this manner, the INDEX file contains entire medium information related to the entire PlayList file recorded in the recording medium 3 and individual information related to individual PlayList files.

The reproducing apparatus 2 can specify whether there is content including video that cannot be displayed in original image quality among the content recorded in the recording medium 3 on the basis of the entire medium information included in the INDEX file.

For example, in a case where the display as an output destination of the video is not compatible with the display of the 4K resolution video, the 4K content recorded in the recording medium 3 is content including video that cannot be displayed in original image quality. In a case where there is content including video that cannot be displayed in original image quality, the reproducing apparatus 2 can display information indicating this and present it to the user.

In addition, in displaying the title list which is a list of the content recorded in the recording medium 3, the reproducing apparatus 2 can present the attribute of each of titles on the basis of individual information included in the INDEX file.

<<3. Configuration Example of Recording Apparatus and Reproducing Apparatus>>

<3-1. Configuration Example of Recording Apparatus>

Figure 6:
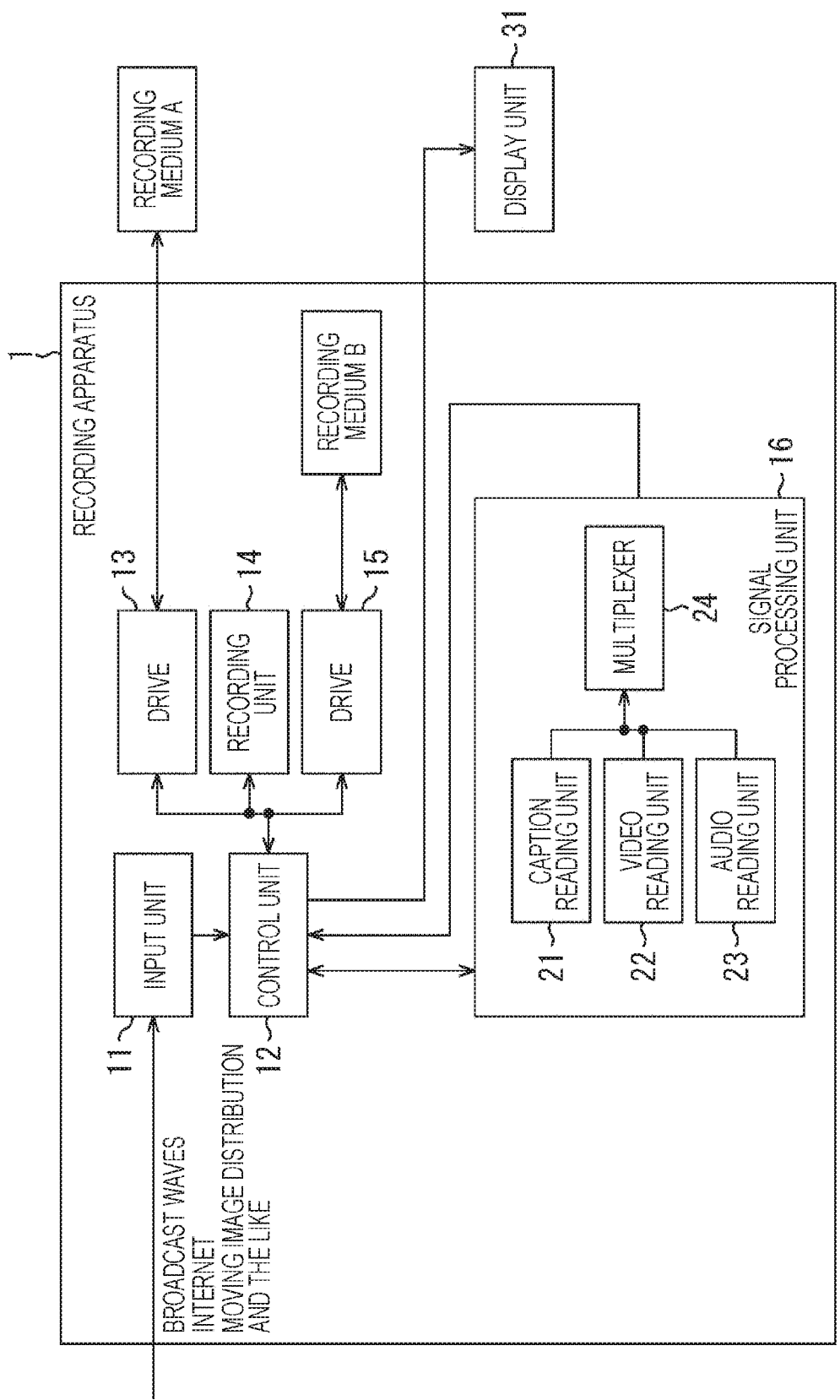
FIG. 6 is a block diagram illustrating an exemplary configuration of a recording apparatus.

FIG. 6 is a block diagram illustrating an exemplary configuration of the recording apparatus 1.

The recording apparatus 1 includes an input unit 11, a control unit 12, a drive 13, a recording unit 14, a drive 15, a signal processing unit 16, and a recording medium B. The signal processing unit 16 includes a caption reading unit 21, a video reading unit 22, an audio reading unit 23, and a multiplexer 24.

To the recording apparatus 1 is connected with a recording medium A which is an external recording medium compliant with SeeQVault. The recording medium A corresponds to the recording medium 3 described above. Hereinafter, a case where the recording destination of content is the recording medium A will be mainly described. The recording medium B is a built-in recording medium such as an HDD and an SSD compliant with SeeQVault.

Moreover, the recording apparatus 1 is connected with a display unit 31. In a case where the recording apparatus 1 is an apparatus without a display, the display unit 31 is configured as a television receiver connected to the recording apparatus 1. In contrast, in a case where the recording apparatus 1 is an apparatus with a display, the display unit 31 is provided inside the recording apparatus 1.

The input unit 11 obtains content as a recording target. The input unit 11 obtains broadcast content, content delivered via the Internet, or the like. The recording apparatus 1 also has a configuration including a receiving unit for receiving a broadcast signal, a communication unit for communicating with an external apparatus via the Internet, or the like. The input unit 11 outputs the obtained content to the control unit 12. Moreover, the input unit 11 receives user's operation on the recording apparatus 1, and outputs information indicating operation details to the control unit 12.

The control unit 12 includes a central processing unit (CPU), a read only memory (ROM), a random access memory (RAM), and the like, and executes a predetermined program to control the entire operation of the recording apparatus 1.

For example, the control unit 12 generates an INDEX file. The control unit 12 outputs the INDEX file together with the content supplied from the input unit 11 to the drive 13, so as to be recorded onto the recording medium A.

In addition, the control unit 12 outputs the content supplied from the input unit 11 as appropriate to the signal processing unit 16, so as to be converted into data that can be recorded in the MP4 file format or the TS Recording file format. In a case where the content obtained by the input unit 11 is not data recordable in the MP4 file format or the TS Recording file format, data conversion is performed by the signal processing unit 16. The control unit 12 outputs the content generated by the signal processing unit 16 to the drive 13, so as to be recorded onto the recording medium A together with the INDEX file.

The drive 13 controls to record the data supplied from the control unit 12 onto the recording medium A in a file format conforming to the SeeQVault standard. Moreover, the drive 13 reads data as appropriate from the recording medium A to be output to the control unit 12.

The recording unit 14 is a built-in recording medium such as an HDD and an SSD. The recording unit 14 records the data supplied from the control unit 12.

The drive 15 controls to record the data supplied from the control unit 12 onto the recording medium B in a file format conforming to the SeeQVault standard. Moreover, the drive 15 reads data as appropriate from the recording medium B and outputs the data to the control unit 12.

The caption reading unit 21 of the signal processing unit 16 reads caption data from the content data supplied from the control unit 12. The caption reading unit 21 outputs the read caption data to the multiplexer 24.

The video reading unit 22 reads video data from the content data supplied from the control unit 12. The video reading unit 22 encodes the read video data by a predetermined coding scheme such as MPEG-4 AVC and HEVC, and outputs the obtained video stream to the multiplexer 24.

The audio reading unit 23 reads audio data from among the content data supplied from the control unit 12. The audio reading unit 23 encodes the read audio data by a predetermined coding scheme such as MPEG-4 AAC, and outputs the obtained audio stream to the multiplexer 24.

The multiplexer 24 multiplexes the caption data supplied from the caption reading unit 21, the video stream supplied from the video reading unit 22, and the audio stream supplied from the audio reading unit 23, so as to generate an MP4 file or a TS file. The multiplexer 24 outputs the generated MP4 file or TS file to the control unit 12.

The display unit 31 is a display such as an LCD, and displays various types of information such as a title list under the control of the control unit 12.

Figure 7:
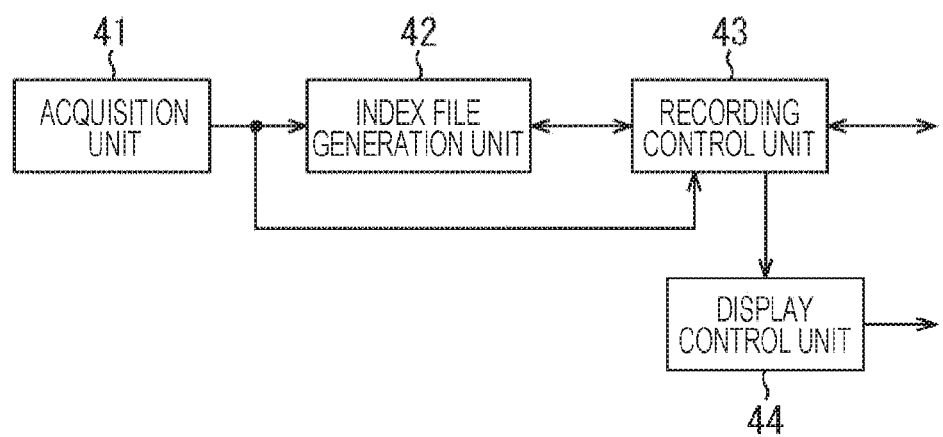
FIG. 7 is a block diagram illustrating an exemplary functional configuration of a recording apparatus.

FIG. 7 is a block diagram illustrating an exemplary functional configuration of the recording apparatus 1. At least a portion of the configuration illustrated in FIG. 7 is implemented by execution of a predetermined program by the control unit 12.

The control unit 12 is provided to implement the acquisition unit 41, the INDEX file generation unit 42, the recording control unit 43, and the display control unit 44.

The acquisition unit 41 obtains the content as a recording target. The content supplied from the input unit 11 is obtained by the acquisition unit 41 as content as a recording target. The acquisition unit 41 outputs the obtained content to the INDEX file generation unit 42 and the recording control unit 43.

The INDEX file generation unit 42 generates an INDEX file on the basis of video data of the content supplied from the acquisition unit 41, and outputs the generated file to the recording control unit 43. In addition, the INDEX file generation unit 42 updates the INDEX file recorded in the recording medium A, and outputs the updated INDEX file to the recording control unit 43.

The recording control unit 43 controls the drive 13 to record the content supplied from the acquisition unit 41 and the INDEX file generated by the INDEX file generation unit 42 onto the recording medium A in the MP4 file format or the TS Recording file format.

Moreover, in a case where the content supplied from the acquisition unit 41 is not data recordable in the MP4 file format or the TS Recording file format, the recording control unit 43 causes the signal processing unit 16 to perform data conversion. The recording control unit 43 controls to record the content obtained by causing the signal processing unit 16 to perform data conversion and the INDEX file generated by the INDEX file generation unit 42, onto the recording medium A in the MP4 file format or TS Recording file format.

The recording control unit 43 reads the INDEX file from the recording medium A and outputs the read INDEX file to the INDEX file generation unit 42 and the display control unit 44. The INDEX file supplied to the INDEX file generation unit 42 is used for updating the INDEX files, and the INDEX file output to the display control unit 44 is used for displaying the title list. The title list displayed by the recording apparatus 1 is used for selecting the content to erase in a case of erasing the content recorded in the recording medium A, as will be described below.

The display control unit 44 controls to display the title list on the display unit 31 on the basis of the INDEX file supplied from the recording control unit 43.

<3-2. Configuration Example of Reproducing Apparatus>

Figure 8:
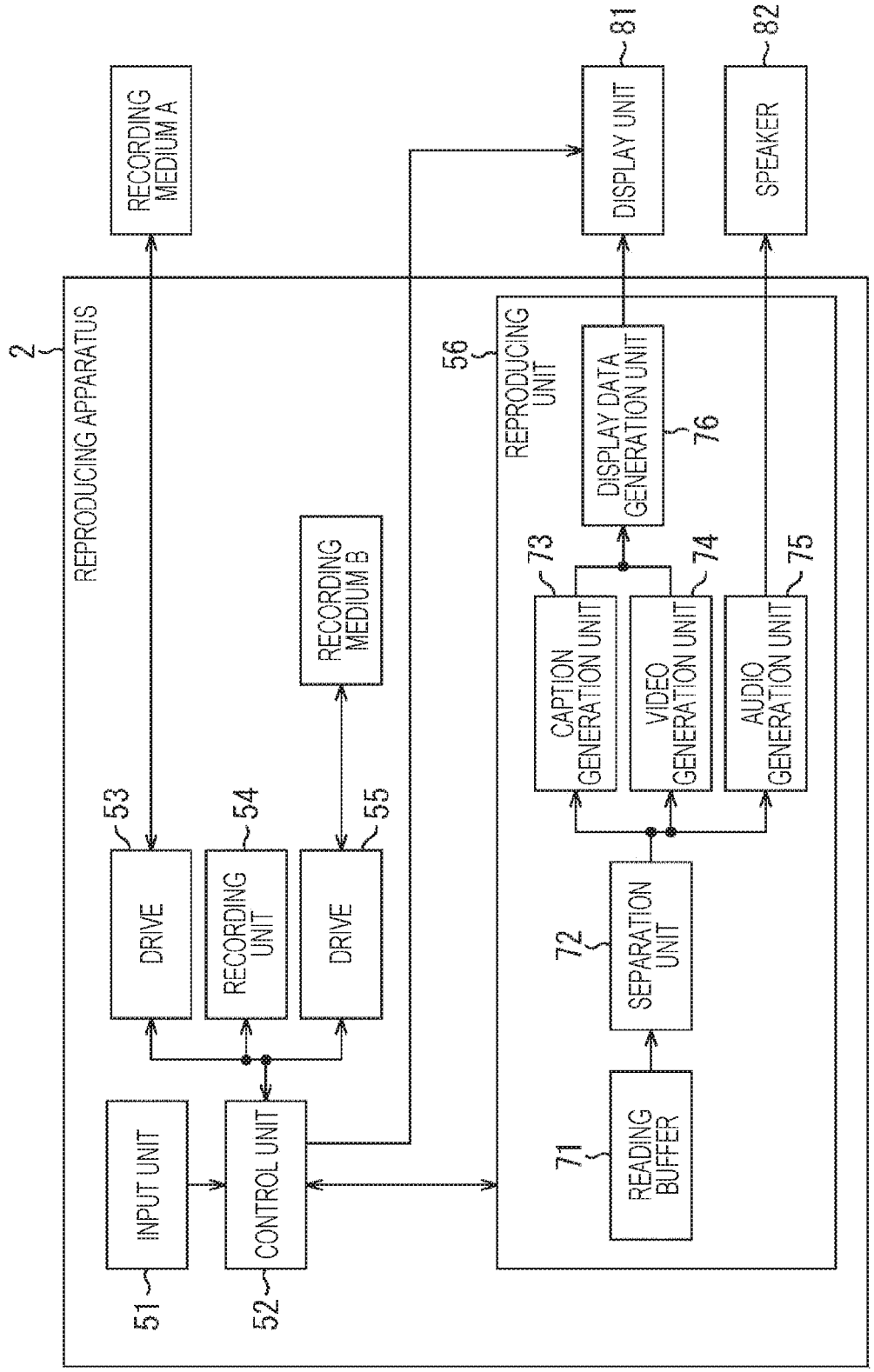
FIG. 8 is a block diagram illustrating an exemplary configuration of a reproducing apparatus.

FIG. 8 is a block diagram illustrating an exemplary configuration of the reproducing apparatus 2.

The reproducing apparatus 2 includes an input unit 51, a control unit 52, a drive 53, a recording unit 54, a drive 55, a reproducing unit 56, and a recording medium B. The reproducing unit 56 includes a reading buffer 71, a separation unit 72, a caption generation unit 73, a video generation unit 74, an audio generation unit 75, and a display data generation unit 76.

The reproducing apparatus 2 is connected with a recording medium 3 corresponding to the recording medium 3. Content is recorded in the recording medium A by the recording apparatus 1. A case of reproducing the content recorded in the recording medium A will be mainly described. The recording medium B is a built-in recording medium such as an HDD and an SSD compliant with SeeQVault.

In addition, the reproducing apparatus 2 is connected with a display unit 81 and a speaker 82. In a case where the reproducing apparatus 2 is an apparatus without a display, such as a media player, the display unit 81 and the speaker 82 is configured as a television receiver connected to the reproducing apparatus 2. The reproducing apparatus 2 and the television receiver are connected with each other via a predetermined interface such as HDMI (registered trademark). In contrast, in a case where the reproducing apparatus 2 is an apparatus with a display, such as a mobile terminal, the display unit 81 and the speaker 82 are provided inside the reproducing apparatus 2.

The input unit 51 receives user's operation on the reproducing apparatus 2 and outputs information indicating operation details to the control unit 52.

The control unit 52 includes a CPU, a ROM, a RAM, and the like, and executes a predetermined program to control entire operation of the reproducing apparatus 2.

For example, the control unit 52 controls the drive 53 to read the INDEX file recorded in the recording medium A. The control unit 52 refers to information included in the INDEX file and controls to display the title list on the display unit 81. The title list is a list of content recorded in the recording medium A. The title list displays attributes of individual content, such as a title, recorded time, broadcast station, and genre. The user of the reproducing apparatus 2 can select the content to reproduce with reference to the title list.

Moreover, on the basis of the entire medium information of the INDEX file, the control unit 52 specifies whether there is content including video that cannot be displayed in original image quality among the content recorded in the recording medium A. The control unit 52 communicates as appropriate with the display unit 81 to obtain information related to the performance of the display unit 81, such as resolution and a luminance range. In a case where there is content including video that cannot be displayed in original image quality, the control unit 52 controls to display information indicating this on the display unit 81.

The control unit 52 controls the drive 53 to read data of the content to which a reproduction instruction is given by the user from the recording medium A, and outputs the data to the reproducing unit 56.

The drive 53 controls the recording medium A to read the data recorded in the recording medium A. The read data is supplied to the control unit 52.

The recording unit 54 is a built-in recording medium such as an HDD and an SSD. The recording unit 54 records the data supplied from the control unit 52.

The drive 55 controls the recording medium B to read the data recorded in the recording medium B. The read data is supplied to the control unit 52.

The reading buffer 71 of the reproducing unit 56 temporarily stores data of the content supplied from the control unit 52.

The separation unit 72 reads the data stored in the reading buffer 71 and separates it into caption data, video data, and audio data. The separation unit 72 outputs the separated caption data, the video data, and the audio data respectively to the caption generation unit 73, the video generation unit 74, and the audio generation unit 75.

The caption generation unit 73 decodes the caption data supplied from the separation unit 72 and outputs the decoded data to the display data generation unit 76.

The video generation unit 74 decodes the video data supplied from the separation unit 72 and outputs the decoded data to the display data generation unit 76.

The audio generation unit 75 decodes the audio data supplied from the separation unit 72. The audio generation unit 75 outputs the decoded data to the speaker 82 to output audio of the content.

The display data generation unit 76 generates data of each of frames of video on the basis of the caption data supplied from the caption generation unit 73 and the video data supplied from the video generation unit 74, and outputs the data as display data to the display unit 81.

The display unit 81 is a display such as an LCD and an organic EL display. The display unit 81 displays various types of information such as a title list under the control of the control unit 52. In addition, the display unit 81 displays video of the content on the basis of the display data supplied from the display data generation unit 76.

The speaker 82 outputs the audio of the content on the basis of the audio data supplied from the audio generation unit 75.

Figure 9:
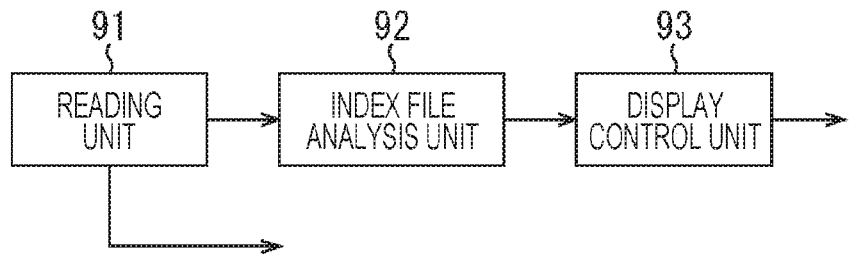
FIG. 9 is a block diagram illustrating an exemplary functional configuration of a reproducing apparatus.

FIG. 9 is a block diagram illustrating an exemplary functional configuration of the reproducing apparatus 2. At least a portion of the configuration illustrated in FIG. 9 is implemented by execution of a predetermined program by the control unit 52.

The control unit 52 is provided to implement a reading unit 91, an INDEX file analysis unit 92, and a display control unit 93.

The reading unit 91 controls the drive 53 to read an INDEX file and a content file from the recording medium A. The reading unit 91 outputs the read INDEX file to the INDEX file analysis unit 92, and outputs the content file to the reproducing unit 56.

The INDEX file analysis unit 92 communicates with the display unit 81 and obtains information related to the performance of the display unit 81. Moreover, the INDEX file analysis unit 92 analyzes the INDEX file supplied from the reading unit 91, and specifies whether there is content including video that cannot be displayed in original image quality among the content recorded in the recording medium A on the basis of the entire medium information of the INDEX file.

In a case where there is content including video with resolution that cannot be displayed by the display unit 81 among the content recorded in the recording medium A, the INDEX file analysis unit 92 specifies that there is content including video that cannot be displayed in original image quality. For example, in a case where the resolution of the video displayable by the display unit 81 is HD, the 4K content and the 8K content recorded in the recording medium 3 are content including video that cannot be displayed in original image quality.

Moreover, in a case where there is content including video having a luminance range that cannot be displayed by the display unit 81 among the content recorded in the recording medium A, the INDEX file analysis unit 92 specifies that there is content including video that cannot be displayed in original image quality. For example, in a case where the luminance range of the video displayable by the display unit 81 is SDR, the HDR content recorded in the recording medium 3 is content including video that cannot be displayed in original image quality.

In a case where the INDEX file analysis unit 92 specifies that there is content including the video that cannot be displayed in original image quality, the INDEX file analysis unit 92 controls the display control unit 93 to display the information indicating this on the display unit 81.

In addition, in a case where there is content including video that cannot be decoded by the video generation unit 74 among the content recorded in the recording medium A, the INDEX file analysis unit 92 specifies that there is content that cannot be reproduced. For example, in a case where the video generation unit 74 does not compatible with decoding of the HEVC content, the HEVC content recorded in the recording medium 3 cannot be reproduced.

In a case where the INDEX file analysis unit 92 specifies that there is content that cannot be reproduced, the INDEX file analysis unit 92 controls the display control unit 93 to display information indicating this on the display unit 81.

It is allowable to give a decoding function to the display unit 81 and to supply an encoded video stream from the reproducing apparatus 2 to the display unit 81. In this case, the information representing the performance of the display unit 81 obtained by the INDEX file analysis unit 92 also includes information related to a codec that the display unit 81 can decode. In a case where there is content including video that cannot be decoded by the display unit 81 among the content recorded in the recording medium A, the INDEX file analysis unit 92 specifies that there is content that cannot be reproduced.

In addition, the INDEX file analysis unit 92 controls the display control unit 93 to display the title list on the display unit 81 on the basis of the INDEX file.

Under the control of the INDEX file analysis unit 92, the display control unit 93 displays information indicating that there is content including video that cannot be displayed in original image quality, and information indicating that there is content that cannot be reproduced, on the display unit 81. Moreover, the display control unit 93 controls to display the title list on the display unit 81.

<<4. Operation Example of Recording Apparatus and Reproducing Apparatus>>

<4-1. Operation of Recording Apparatus>

Now, operation of the recording apparatus 1 having the above configuration will be described.

First, processing of the recording apparatus 1 that records the content in the recording medium A (recording medium 3) will be described with reference to the flowchart of FIG. 10.

In step S1, the acquisition unit 41 (FIG. 7) obtains an AV stream of the content as a recording target, supplied from the input unit 11. In addition to the AV stream or the like, reproduction control information such as PlayList is also obtained by the acquisition unit 41.

In step S2, the INDEX file generation unit 42 analyzes the data supplied from the input unit 11 and confirms attributes such as video resolution, the luminance range, and the codec. The video stream contains video attribute information.

In step S3, the recording control unit 43 causes the signal processing unit 16 to perform re-multiplexing as necessary, so as to generate data of MP4 content recordable in the MP4 file format or the data of PlayList content recordable in the TS Recording file format.

In step S4, the recording control unit 43 reads the INDEX file recorded in the recording medium A. The INDEX file read by the recording control unit 43 is supplied to the INDEX file generation unit 42.

In step S5, the INDEX file generation unit 42 performs INDEX file management processing. With the INDEX file management processing, the INDEX file recorded in the recording medium A is updated in accordance with the attribute of the content as a recording target. The INDEX file management processing will be described below with reference to the flowcharts of FIGS. 11 and 12.

In step S6, the recording control unit 43 controls the drive 13 to record the INDEX file, and the MP4 content file or the PlayList content file, onto the recording medium A. Thereafter, the recording processing is finished.

Figure 11:
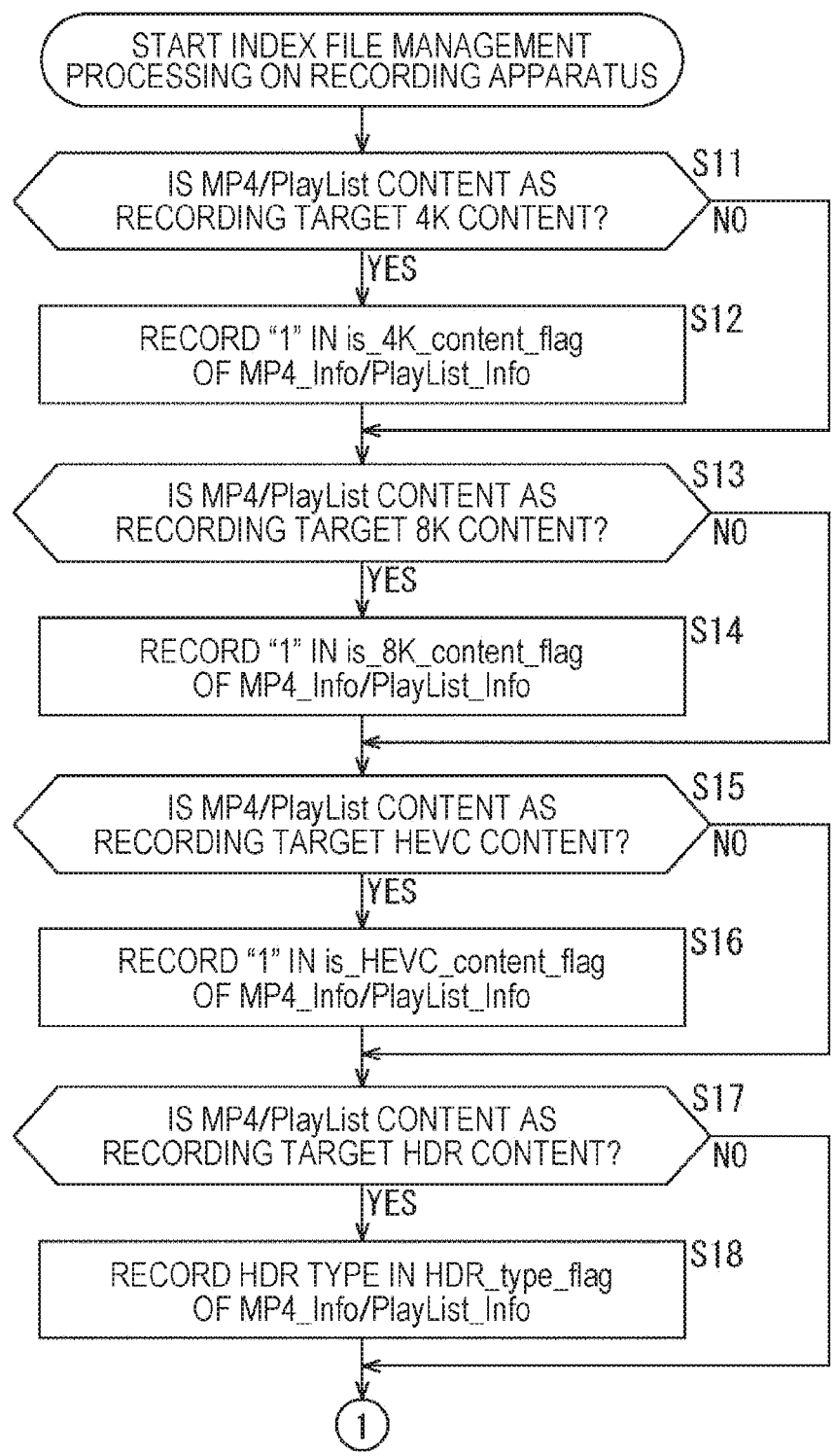
FIG. 11 is a flowchart illustrating INDEX file management processing performed in step S5 in FIG. 10.
Figure 12:
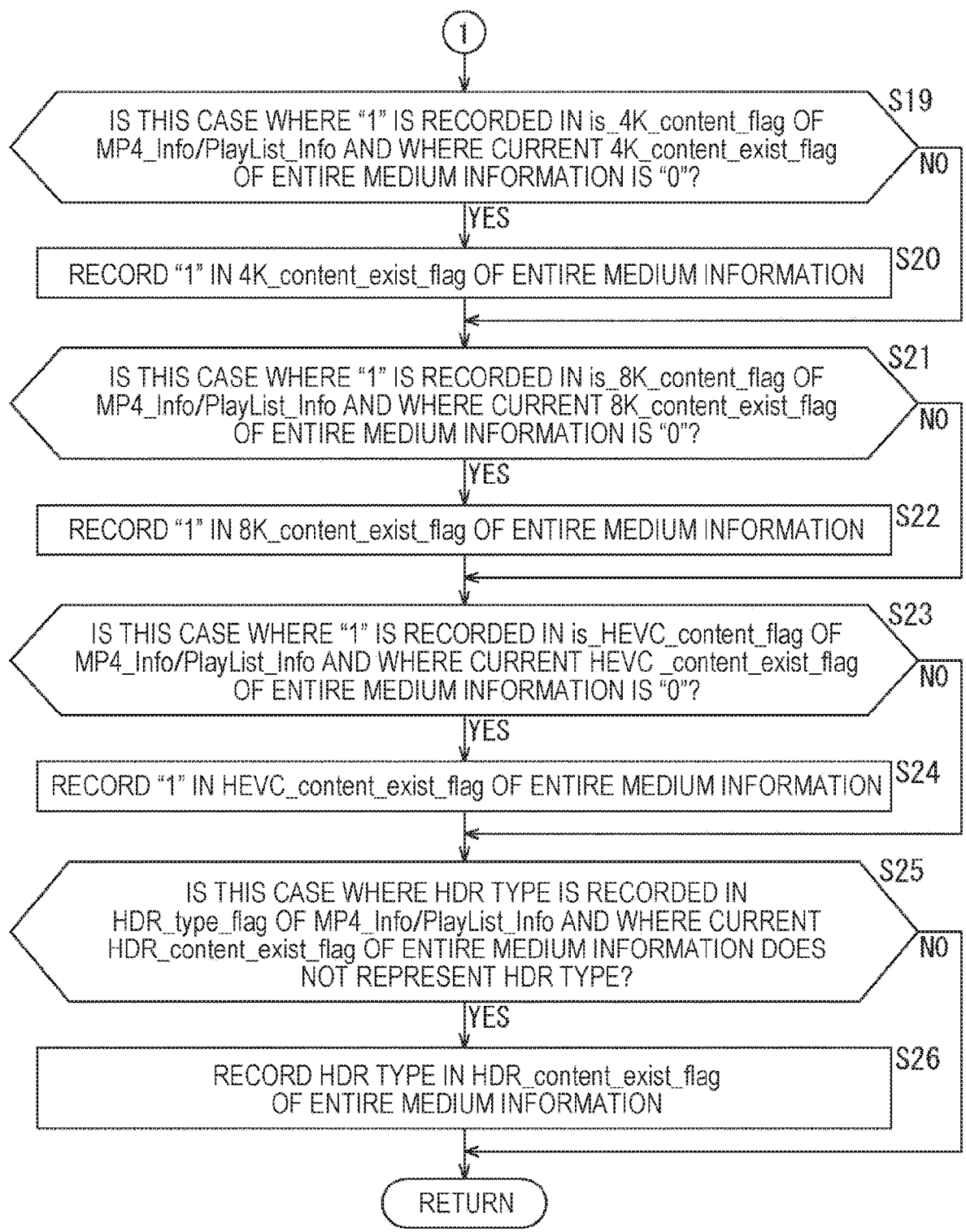
FIG. 12 is a flowchart following FIG. 11, illustrating the INDEX file management processing performed in step S5 in FIG. 10.

Next, the INDEX file management processing performed in step S5 of FIG. 10 will be described with reference to the flowcharts of FIGS. 11 and 12.

In step S11, the INDEX file generation unit 42 determines whether the MP4 content or the PlayList content as a recording target is 4K content. The determination here is performed on the basis of a confirmation result of step S2 in FIG. 10. In a case where it is determined in step S11 that the content as a recording target is 4K content, the processing proceeds to step S12.

In step S12, the INDEX file generation unit 42 records 1 in is_4K_content_flag of MP4_info ( ) or PlayList_info ( ), which is individual information of the content as a recording target. In a case where it is determined in step S11 that the content as a recording target is not 4K content, the processing of step S12 is skipped.

In step S13, the INDEX file generation unit 42 determines whether the MP4 content or the PlayList content as a recording target is 8K content. In a case where it is determined in step S13 that the content as a recording target is 8K content, the processing proceeds to step S14.

In step S14, the INDEX file generation unit 42 records 1 in is_8K_content_flag of MP4_info ( ) or PlayList_info ( ), which is individual information of the content as a recording target. In a case where it is determined in step S13 that the content as a recording target is not 8K content, the processing of step S14 is skipped.

In step S15, the INDEX file generation unit 42 determines whether the MP4 content or the PlayList content as a recording target is HEVC content. In a case where it is determined in step S15 that the content as a recording target is HEVC content, the processing proceeds to step S16.

In step S16, the INDEX file generation unit 42 records 1 in is_HEVC_content_flag of MP4_info ( ) or PlayList_info ( ), which is individual information of the content as a recording target. In a case where it is determined in step S15 that the content as a recording target is not HEVC content, the processing of step S16 is skipped.

In step S17, the INDEX file generation unit 42 determines whether the MP4 content or the PlayList content as a recording target is HDR content. In a case where it is determined in step S17 that the content as a recording target is HDR content, the processing proceeds to step S18.

In step S18, the INDEX file generation unit 42 records a value representing the HDR type in HDR_type_flag of MP4_info ( ) or PlayList_info ( ), which is individual information of the content as a recording target.

As a result, individual information related to the content as a recording target is completed. In a case where it is determined in step S17 that the content as a recording target is not HDR content, the processing of step S18 is skipped.

In step S19, the INDEX file generation unit 42 determines whether this is a case where 1 is recorded in is_4K_content_flag of MP4_info ( ) or PlayList_info ( ), and where the current value of 4K_content_exist_flag the entire medium information is 0. In a case where it is determined in step S19 that 1 is recorded in the is_4K_content_flag of the individual information by the processing of step S12 and where the current value of 4K_content_exist_flag of the entire medium information is 0, the processing proceeds to step S20.

In step S20, the INDEX file generation unit 42 records 1 in 4K_content_exist_flag of the entire medium information. In a case where it is determined in step S19 that 1 is not recorded in is_4K_content_flag of MP4_info ( ) or PlayList_info ( ), or where the current value of 4K_content_exist_flag of the entire medium information is already 1, the processing in step S20 is skipped.

In step S21, the INDEX file generation unit 42 determines whether this is a case where 1 is recorded in is_8K_content_flag of MP4_info ( ) or PlayList_info ( ), and where the current value of 8K_content_exist_flag of the entire medium information is 0. In a case where it is determined in step S21 that 1 is recorded in is_8K_content_flag of the individual information by the processing of step S14 and where the current value of 8K_content_exist_flag of the entire medium information is 0, the processing proceeds to step S22.

In step S22, the INDEX file generation unit 42 records 1 in 8K_content_exist_flag of the entire medium information. In a case where it is determined in step S21 that 1 is not recorded in is_8K_content_flag of MP4_info ( ) or PlayList_info ( ), or where the current value of 8K_content_exist_flag of the entire medium information is already 1, the processing in step S22 is skipped.

In step S23, the INDEX file generation unit 42 determines whether this is a case where 1 is recorded in is_HEVC_content_flag of MP4_info ( ) or PlayList_info ( ), and where the current value of HEVC_content_exist_flag of the entire medium information is 0. In a case where it is determined in step S23 that 1 is recorded in the is_HEVC_content_flag of the individual information by the processing of step S16 and where the current value of HEVC_content_exist_flag of the entire medium information is 0, the processing proceeds to step S24.

In step S24, the INDEX file generation unit 42 records 1 in the HEVC_content_exist_flag of the entire medium information. In a case where it is determined in step S23 that 1 is not recorded in is_HEVC_content_flag of MP4_info ( ) or PlayList_info ( ), or where the current value of HEVC_content_exist_flag of the entire medium information is already 1, the processing in step S24 is skipped.

In step S25, the INDEX file generation unit 42 determines whether this is a case where the HDR type is recorded in the HDR_type_flag of MP4_info ( ) or PlayList_info ( ) and where the current HDR_content_exist_flag of the entire medium information does not represent the HDR type. In a case where it is determined in step S25 that a predetermined value is recorded in the HDR_type_flag of the individual information by the processing of step S18 and where the current value of HDR_content_exist_flag of the entire medium information does not represent the HDR type, the processing proceeds to step S26.

In step S26, the INDEX file generation unit 42 records the value representing the HDR type in the HDR_content_exist_flag of the entire medium information. In a case where it is determined in step S25 that the HDR type is not recorded in the HDR_type_flag of MP4 info ( ) or PlayList_info ( ) or that the current value of HDR_content_exist_flag of the entire medium information already represents the HDR type, the processing of step S26 is skipped.

Figure 10:
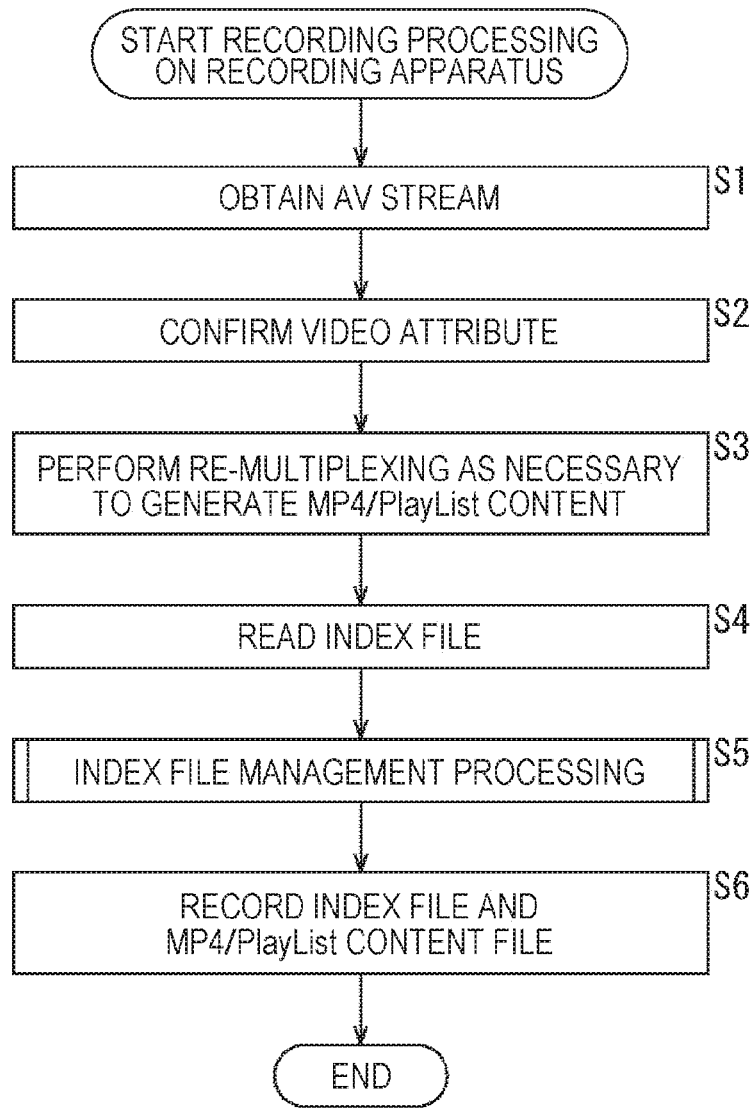
FIG. 10 is a flowchart illustrating recording processing of a recording apparatus.

After the processing in step S26 or after the processing in step S26 is skipped, the processing returns to step S4 in FIG. 10 and the subsequent processing is performed.

With the processing described above, an INDEX file containing individual information including the attribute of the content as a recording target and the entire medium information rewritten as appropriate in accordance with the attribute of the content as a recording target is generated and recorded onto the recording medium A together with the file of the content as a recording target.

Next, processing of editing recorded content performed by the recording apparatus 1 will be described with reference to the flowchart of FIG. 13.

The user can select predetermined content and erase (delete) the content in a state where the title list is displayed, for example, so as to increase the free space of the recording medium A. The recording apparatus 1 updates the INDEX file in accordance with the erasing of the content. In this case, the recording apparatus 1 functions as an editing apparatus for editing recorded content.

In step S41, the recording control unit 43 controls the drive 13 to read the INDEX file from the recording medium A. The read INDEX file is supplied to the display control unit 44.

In step S42, the display control unit 44 causes the display unit 31 to display the title list. The user can operate a remote controller or the like of the recording apparatus 1 to select content to be erased.

In a case where the content to be erased is selected from the title list, the recording control unit 43 determines in step S43 whether an AV stream of the content to be erased is not referenced by other content.

The content recorded in the recording medium A includes content that shares an AV stream with other content. In a case where the AV stream of the content selected to be erased by the user is a stream that is also used at the time of reproducing other content, the erasing of the AV stream is disabled.

For example, in a case where the content selected to be erased is PlayList content, the recording control unit 43 specifies the AV stream to be used for reproduction with reference to the PlayList file. As described above, the PlayList file contains information representing the TS file used for reproduction. In addition, the recording control unit 43 confirms whether there is other content that uses the specified AV stream on the basis of information included in each of PlayList files.

In a case where there is no other content that uses the AV stream of the content selected to be erased, the recording control unit 43 determines that this AV stream is not referenced from other content. Moreover, in a case where there is other content that uses the AV stream of the content selected to be erased, the recording control unit 43 determines that the content is referenced from other content.

In a case where it is determined in step S43 that the AV stream of the content to be erased is not referenced by other content, the processing proceeds to step S44.

In step S44, the recording control unit 43 erases the file of the MP4 content or the PlayList content selected to be erased, from the recording medium A.

In step S45, the INDEX file generation unit 42 performs INDEX file management processing. With the INDEX file management processing, the INDEX file recorded in the recording medium A is updated in accordance with the attribute of the erased content. The INDEX file management processing will be described below with reference to the flowcharts of FIGS. 14 and 15.

In contrast, in a case where it is determined in step S43 that the AV stream of the content to be erased is being referenced by other content, the processing proceeds to step S46.

In step S46, the recording control unit 43 erases from the recording medium A the related file excluding the file of the AV stream referenced by other content, from among the files of the MP4 content or the PlayList content selected to be erased.

After the INDEX file management processing in step S45 or after some related files are erased in step S46, the processing is finished.

Figure 14:
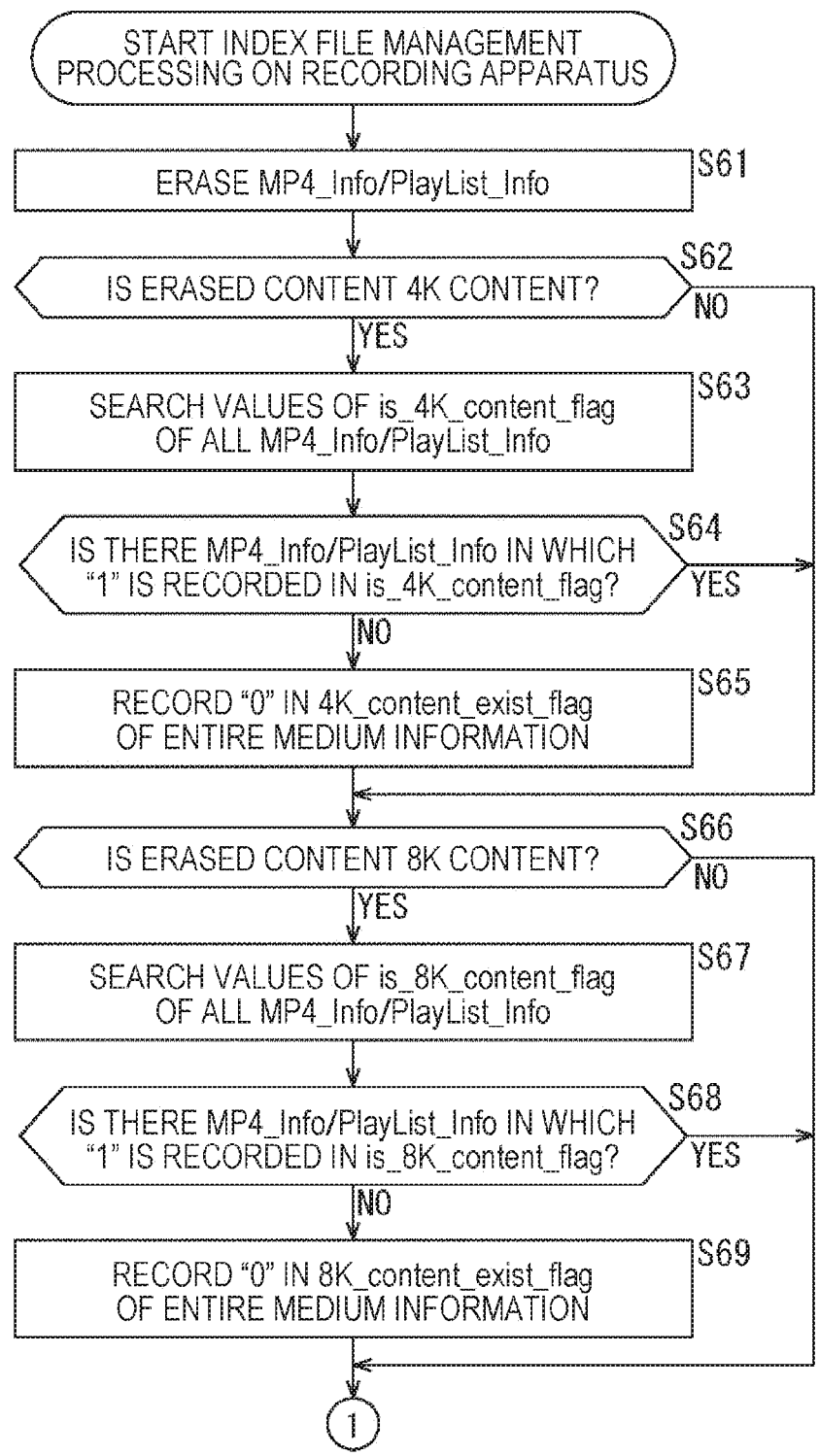
FIG. 14 is a flowchart illustrating INDEX file management processing performed in step S45 in FIG. 13.
Figure 15:
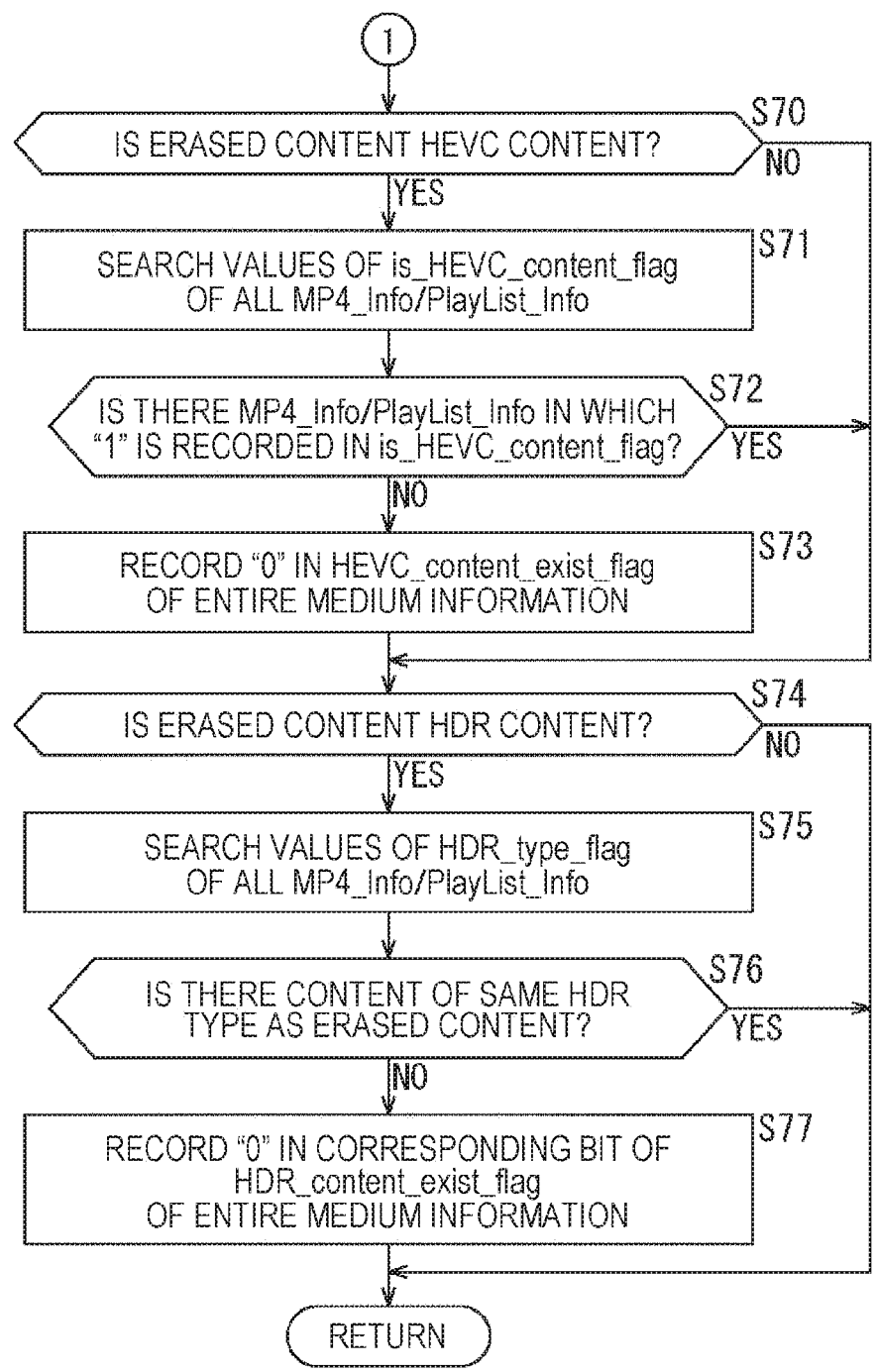
FIG. 15 is a flowchart following FIG. 14, illustrating the INDEX file management processing performed in step S45 in FIG. 13.

Next, the INDEX file management processing performed in step S45 of FIG. 13 will be described with reference to the flowcharts of FIGS. 14 and 15.

In step S61, the INDEX file generation unit 42 erases individual information of the erased content among MP4_info ( ) or PlayList_info ( ) contained in the INDEX file read from the recording medium A.

In step S62, the INDEX file generation unit 42 determines whether the erased MP4 content or PlayList content is 4K content. In a case where it is determined in step S62 that the erased content is 4K content, the processing proceeds to step S63.

In step S63, the INDEX file generation unit 42 searches for the value of is_4K_content_flag of MP4_info ( ) or PlayList_info ( ), which is individual information of all the content recorded in the recording medium A.

In step S64, the INDEX file generation unit 42 determines whether there is MP4 info ( ) or PlayList_info ( ) in which 1 is recorded as the value of is_4K_content_flag on the basis of the search result in step S63. In a case where it is determined that there is no individual information in which 1 is recorded as the value of is_4K_content_flag, that is, where the erased content alone is 4K content, the processing proceeds to step S65.

In step S65, the INDEX file generation unit 42 records 0 in 4K_content_exist_flag of the entire medium information. This operation enables 4K_content_exist_flag to indicate that no 4K content exists in the recording medium A.

In a case where it is determined in step S62 that the erased content is not 4K content, the processing in steps S63 to S65 is skipped. Moreover, in a case where it is determined in step S64 that there is MP4_info ( ) or PlayList_info ( ) in which 1 is recorded as the value of is_4K_content_flag, the processing in step S65 is skipped.

In step S66, the INDEX file generation unit 42 determines whether the erased MP4 content or PlayList content is 8K content. In a case where it is determined in step S66 that the erased content is 8K content, the processing proceeds to step S67.

In step S67, the INDEX file generation unit 42 searches for the value of is_8K_content_flag of MP4_info ( ) or PlayList_info ( ), which is individual information of all the content recorded in the recording medium A.

In step S68, the INDEX file generation unit 42 determines whether there is MP4 info ( ) or PlayList_info ( ) in which 1 is recorded as the value of is_8K_content_flag on the basis of the search result in step S67. In a case where it is determined that there is no individual information in which 1 is recorded as the value of is_8K_content_flag, that is, where the erased content alone is 8K content, the processing proceeds to step S69.

In step S69, the INDEX file generation unit 42 records 0 in 8K_content_exist_flag of the entire medium information. This operation enables 8K_content_exist_flag to indicate that no 8K content exists in the recording medium A.

In a case where it is determined in step S66 that the erased content is not 8K content, the processing in steps S67 to S69 is skipped. Moreover, in a case where it is determined in step S68 that there is MP4 info ( ) or PlayList_info ( ) in which 1 is recorded as the value of is_8K_content_flag, the processing in step S69 is skipped.

In step S70, the INDEX file generation unit 42 determines whether the erased MP4 content or the PlayList content is HEVC content. In a case where it is determined in step S70 that the erased content is HEVC content, the processing proceeds to step S71.

In step S71, the INDEX file generation unit 42 searches for the value of is_HEVC_content_flag of MP4_info ( ) or PlayList_info ( ), which is individual information of all the content recorded in the recording medium A.

In step S72, the INDEX file generation unit 42 determines whether there is MP4_info ( ) or PlayList_info ( ) in which 1 is recorded as the value of is_HEVC_content_flag on the basis of a search result in step S71. In a case where it is determined that there is no individual information in which 1 is recorded as the value of is_HEVC_content_flag, that is, where the erased content alone is HEVC content, the processing proceeds to step S73.

In step S73, the INDEX file generation unit 42 records 0 in HEVC_content_exist_flag of the entire medium information. This operation enables HEVC_content_exist_flag to indicate that no HEVC content exists in the recording medium A.

In a case where it is determined in step S70 that the erased content is not HEVC content, the processing in steps S71 to S73 is skipped. Moreover, in a case where it is determined in step S72 that there is MP4_info ( ) or PlayList_info ( ) in which 1 is recorded as the value of is_HEVC_content_flag, the processing in step S73 is skipped.

In step S74, the INDEX file generation unit 42 determines whether the erased MP4 content or the PlayList content is HDR content. In a case where it is determined in step S74 that the erased content is HDR content, the processing proceeds to step S75.

In step S75, the INDEX file generation unit 42 searches for the value of HDR_type_flag of MP4_info ( ) or PlayList_info ( ), which is individual information of all the content recorded in the recording medium A.

In step S76, the INDEX file generation unit 42 determines whether there is content of the same HDR type as the erased content (HDR content), on the basis of the search result of step S75. In a case where it is determined that there is no content of the same HDR type, the processing proceeds to step S77.

In step S77, the INDEX file generation unit 42 records 0 in a corresponding bit of the HDR_content_exist_flag of the entire medium information. The bit in which 0 is recorded is a bit corresponding to the HDR type of the erased content. This operation enables HDR_content_exist_flag to indicate that no content of the same HDR type as the erased content exists in the recording medium A.

Figure 13:
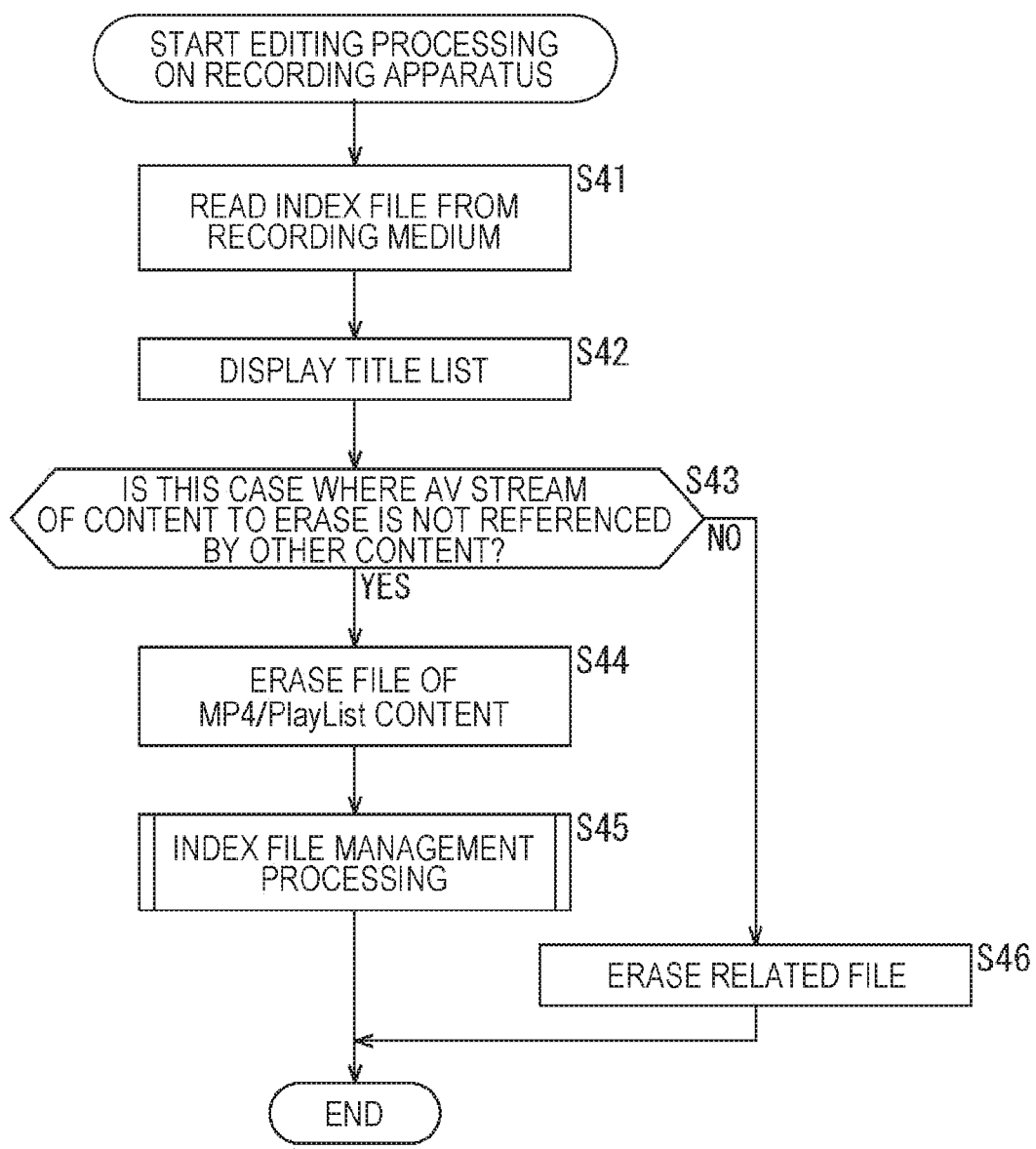
FIG. 13 is a flowchart illustrating editing processing of a recording apparatus.

In a case where it is determined in step S74 that the erased content is not HDR content, the processing in steps S75 to S77 is skipped, and the processing in step S45 in FIG. 13 and subsequent processing is performed. Moreover, in a case where it is determined in step S76 that there is content of the same HDR type as the erased content, the processing in step S77 is skipped and the processing in step S45 in FIG. 13 and subsequent processing is performed.

As described above, in a case where content is erased, the entire medium information is also updated as appropriate in accordance with the erasing of the individual information of the INDEX file. This enables the INDEX file to represent the latest state of the recording medium A.

<4-2. Operation of Reproducing Apparatus>

Next, operation of the reproducing apparatus 2 will be described.

With reference to the flowcharts of FIGS. 16 and 17, processing of reproducing the content recorded in the recording medium A by the reproducing apparatus 2 will be described.

Figure 16:
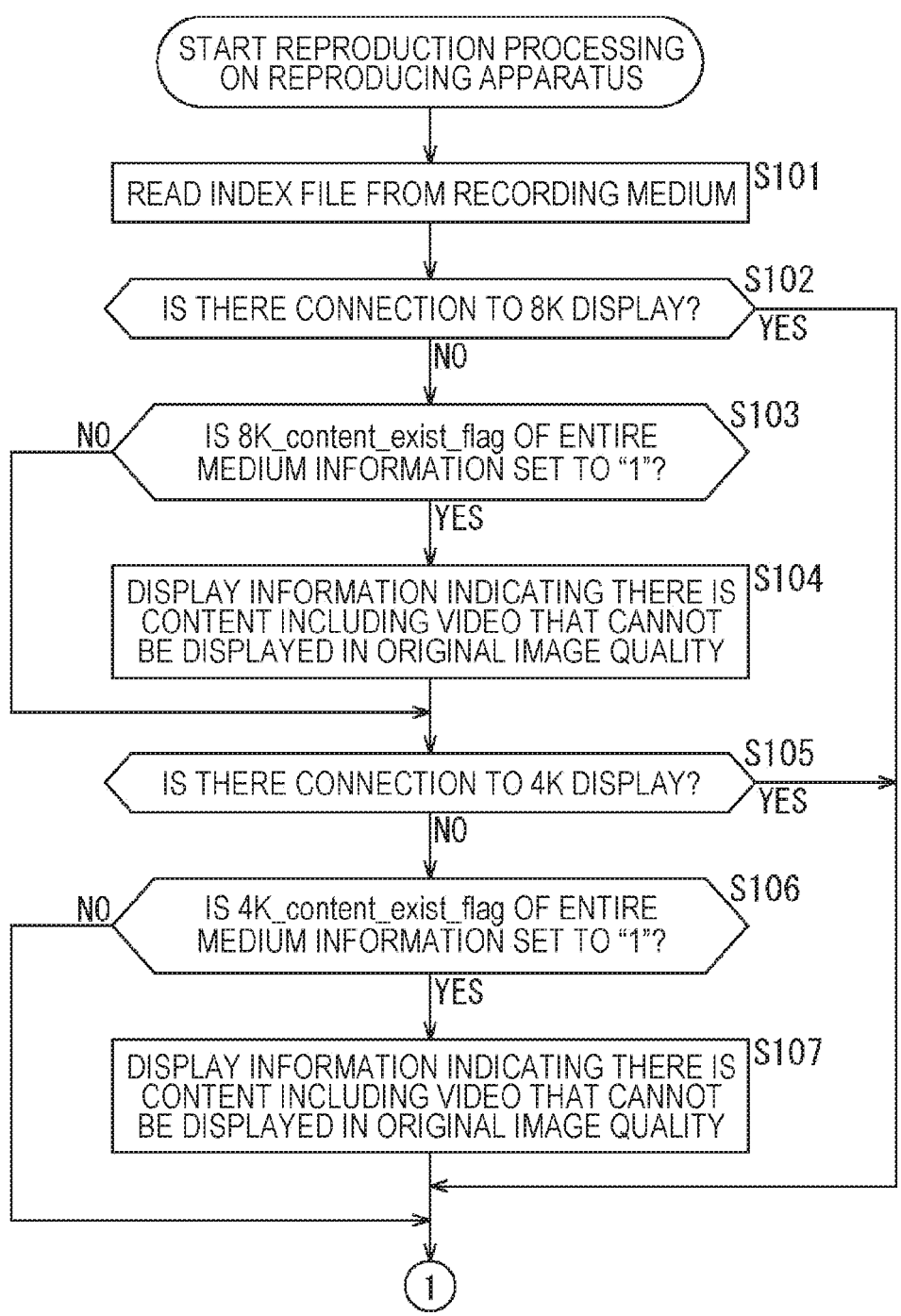
FIG. 16 is a flowchart illustrating reproducing processing of a reproducing apparatus.
Figure 17:
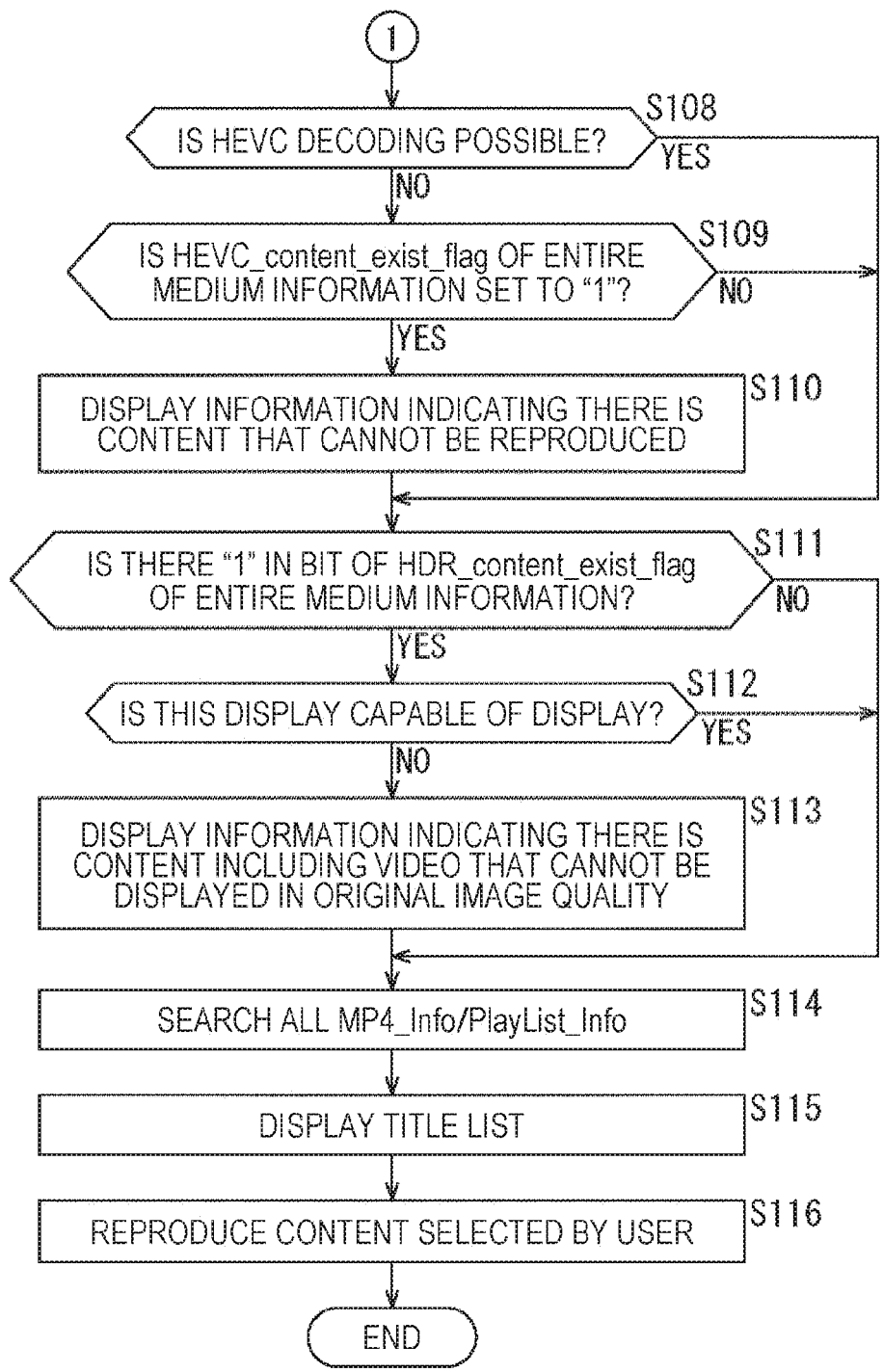
FIG. 17 is a flowchart following FIG. 16, illustrating reproducing processing of a reproducing apparatus.

The processing in FIGS. 16 and 17 is started, for example, when the recording medium A on which the content is recorded by the recording apparatus 1 is attached to the reproducing apparatus 2 and the user instructs title list display.

In step S101, the reading unit 91 (FIG. 9) controls the drive 53 to read an INDEX file from the recording medium A. The reading unit 91 outputs the read INDEX file to the INDEX file analysis unit 92.

In step S102, the INDEX file analysis unit 92 determines whether there is connection to the 8K display. Information representing the performance of the display of the display unit 81 is obtained from the display unit 81 connected to the reproducing apparatus 2. In a case where it is determined in step S102 that there is no connection to the 8K display having 8K resolution, the processing proceeds to step S103.

In step S103, the INDEX file analysis unit 92 determines whether the value of 8K_content_exist_flag of the entire medium information is 1. In a case where the value of 8K_content_exist_flag of the entire medium information is 1, that is, when 8K content is recorded in the recording medium A, the processing proceeds to step S104.

In step S104, the display control unit 93 controls to display information indicating that there is content including video that cannot be displayed in original image quality, on the display unit 81. The 8K content recorded in the recording medium A is content including video that cannot be displayed in original image quality.

FIG. 18 is a diagram illustrating a display example of the display unit 81.

As illustrated in FIG. 18, a message indicating that there is content including video that cannot be displayed in original image quality is displayed on the display unit 81. Moreover, this message is followed by a message indicating the performance of the display needed to display the video in original image quality.

Here, in a case where the user selects to reproduce the 8K content even when the video cannot be displayed in original image quality, the video with the 8K resolution is converted into video with resolution that can be displayed on the display unit 81 by the display data generation unit 76, for example, and is output to the display unit 81.

This enables the user to view the content with the 4K resolution or the HD resolution video that can be displayed by the display unit 81 even though it is lower than original image quality.

In a case where it is determined in step S103 that the value of 8K_content_exist_flag of the entire medium information is not 1, the processing in step S104 is skipped.

In step S105, the INDEX file analysis unit 92 determines whether there is connection to the 4K display. In a case where it is determined in step S105 that there is no connection to the 4K display having the 4K resolution, the processing proceeds to step S106.

In step S106, the INDEX file analysis unit 92 determines whether the value of 4K_content_exist_flag of the entire medium information is 1. In a case where the value of 4K_content_exist_flag of the entire medium information is 1, that is, 4K content is recorded in the recording medium A, the processing proceeds to step S107.

In step S107, the display control unit 93 controls to display information indicating that there is content including video that cannot be displayed in original image quality, on the display unit 81. The 4K content recorded in the recording medium A is content including video that cannot be displayed in original image quality. Similarly to FIG. 18, the screen of the display unit 81 displays a message indicating that there is content including video that cannot be displayed in original image quality, followed by a message indicating the performance of the display needed to display video in original image quality.

In a case where it is determined in step S106 that the value of 4K_content_exist_flag of the entire medium information is not 1, the processing in step S107 is skipped. Moreover, in a case where it is determined in step S105 that there is connection to the 4K display, the processing in steps S106 and S107 is skipped. In a case where it is determined in step S102 that there is connection to the 8K display, the processing in steps S103 to S107 is skipped.

In step S108, the INDEX file analysis unit 92 determines whether the reproducing apparatus 2 itself can decode the HEVC content. In a case where it is determined in step S108 that HEVC content cannot be decoded, the processing proceeds to step S109.

In step S109, the INDEX file analysis unit 92 determines whether the value of HEVC_content_exist_flag of the entire medium information is 1. In a case where the value of HEVC_content_exist_flag of the entire medium information is 1, that is, in a case where HEVC content is recorded in the recording medium A, the processing proceeds to step S110.

In step S110, the display control unit 93 controls to display information indicating that there is content that cannot be reproduced, on the display unit 81. The HEVC content recorded in the recording medium A is content that cannot be reproduced.

In a case where it is determined in step S109 that the value of HEVC_content_exist_flag of the entire medium information is not 1, the processing in step S110 is skipped. Moreover, in a case where it is determined in step S108 that the HEVC content can be decoded, the processing in steps S109 and S110 is skipped.

In step S111, the INDEX file analysis unit 92 determines whether there is a bit in which a value of 1 is recorded among the bits of the HDR_content_exist_flag of the entire medium information. In a case where a bit in which the value of 1 is recorded is recorded, that is, when HDR content of a predetermined HDR type is recorded in the recording medium A, the processing proceeds to step S112.

In step S112, the INDEX file analysis unit 92 determines whether there is connection to a display capable of displaying the HDR content recorded in the recording medium A. In a case where it is determined in step S112 that there is no connection to the display capable of displaying the content the processing proceeds to step S113.

In step S113, the display control unit 93 controls to display information indicating that there is content including video that cannot be displayed in original image quality, on the display unit 81. Similarly to FIG. 18, the screen of the display unit 81 displays a message indicating that there is content including video that cannot be displayed in original image quality, followed by a message indicating the performance of the display needed to display video in original image quality.

In a case where it is determined in step S111 that there is no bit in which the value of 1 is recorded among the bits of HDR_content_exist_flag of the entire medium information, the processing in steps S112 and S113 is skipped. Moreover, in a case where it is determined in step S112 that there is connection with a display capable of displaying the HDR content recorded in the recording medium A, the processing of step S113 is skipped.

In step S114, the INDEX file analysis unit 92 searches for MP4_info ( ) or PlayList_info ( ), which is individual information of all the content recorded in the recording medium A.

In step S115, the display control unit 93 controls to display the title list on the display unit 81 on the basis of the individual information of the INDEX file.

FIG. 19 is a diagram illustrating a display example of a title list.

As illustrated in FIG. 19, the title list displays in a predetermined order information of the content recorded in the recording medium A. Titles, recorded date and time, broadcast stations, genre are displayed on the basis of information included in individual information of the INDEX file.

The example of FIG. 19 displays information of programs A to E as HD content, for example, and in addition to programs A to E, there is an icon 201 displayed in the upper right to indicate that 4K content is recorded in the recording medium A. The icon 201 is information displayed on the basis of 4K_content_exist_flag included in the entire medium information, for example.

The user can operate a remote controller of the reproducing apparatus 2, for example, to operate the icon 201, so as to display information of 4K content recorded in the recording medium A, instead of the programs A to E. In this manner, the INDEX file contains the entire medium information, making it possible to display the title list using the entire medium information, in addition to the individual information.

The user can select content to be reproduced from a title list like this. In a case where the content to be reproduced is selected, the reading unit 91 reads a file for the content from the recording medium A and outputs the file to the reproducing unit 56.

In step S116, the reproducing unit 56 reproduces the content selected by the user, and displays video of the content on the display unit 81. Moreover, the reproducing unit 56 outputs audio of the content from the speaker 82. When the content is reproduced, the processing is finished.

As described above, the reproducing apparatus 2 can easily specify from the information included in the entire medium information of the INDEX file that there is content including the video that cannot be displayed in original image quality among the content recorded in the recording medium A. That is, the reproducing apparatus 2 can specify that there is content including the video that cannot be displayed in original image quality without reference to individual information or analyzing individual content files such as an MP4 file or a PlayList file.

<<5. Modification>>

<5-1. Application Example>

It is also possible to use the entire medium information of the INDEX file for displaying other information.

FIG. 20 is a diagram illustrating another display example of the display unit 81.

The screen of FIG. 20 displays information indicating that 4K content is recorded in the recording medium A among the recording medium A and the recording medium B, and that the HDR content of the HDR type 1 is recorded in the recording medium A and the recording medium B.

These pieces of information are displayed on the basis of the state that a value of 1 is set to 4K_content_exist_flag included in the entire medium information of the INDEX file recorded in the recording medium A and the state that a value of 1 is set to the bit corresponding to HDR type 1 of HDR_content_exit_flag. In addition, the information is displayed on the basis of the state that a value of 1 is set to the bit corresponding to the HDR type 1 of the HDR_content_exit_flag included in the entire medium information of the INDEX file recorded in the recording medium B.

This enables the user to easily confirm in which recording medium the UHD content or the like is recorded. There is no need, even as the reproducing apparatus 1, to analyze the content files in order to display such information.

FIG. 21 is a diagram illustrating still another display example of the display unit 81.

The example of FIG. 21 displays information indicating that the video resolution is 4K or 8K is displayed as the attribute of each pieces of content. The information 4K or 8K is displayed on the basis of the values of is_4K_content_flag and is_8K_content_flag included in the individual information of the INDEX file.

In this manner, it is also possible to display the attributes of each of pieces of content in the title list on the basis of is_4K_content_flag, is_8K_content_flag, is_HEVC_content_flag, and HDR_type_flag included in the individual information.

<5-2. Others>

While the above describes a case where the four types of flags 4K_content_exist_flag, 8K_content_exist_flag, HEVC_content_exist_flag, and HDR_content_exit_flag are included in the entire medium information of the INDEX file, it is also allowable to configure such that at least any of the flags is included.

Moreover, while four types of flags, is_4K_content_flag, is_8K_content_flag, is_HEVC_content_flag, and HDR_type_flag are included in the individual information, at least any of the flags may be included.

Furthermore, while each of 4K_content_exist_flag, 8K_content_exist_flag, HEVC_content_exist_flag, is_4K_content_flag, is_8K_content_flag, and is_HEVC_content_flag is a 1-bit flag and each of HDR_content_exit_flag and HDR_type_flag is a 16-bit flag, the number of bits can be changed as appropriate.

While the 4K resolution and 8K resolution have been described as UHD higher than HD, the UHD may be of any type, such as 16K resolution. In addition, while HEVC is used as the video codec, it is allowable to use any type of codec.

In the above description, the recording apparatus 1, the reproducing apparatus 2, and the recording medium 3 are apparatuses compliant with SeeQVault. Alternatively, however, the above content can be applied to other recording format for recording INDEX files.

It is also possible to implement functions of the recording apparatus 1 and functions of the reproducing apparatus 2 on one information processing apparatus.

<5-3. Configuration Example of Computer>

A series of processing described above can be executed in hardware or with software. In a case where the series of processing is executed by software, a program constituting the software is installed onto a computer incorporated in dedicated hardware, a general-purpose computer, or the like, from a program recording medium.

Figure 22:
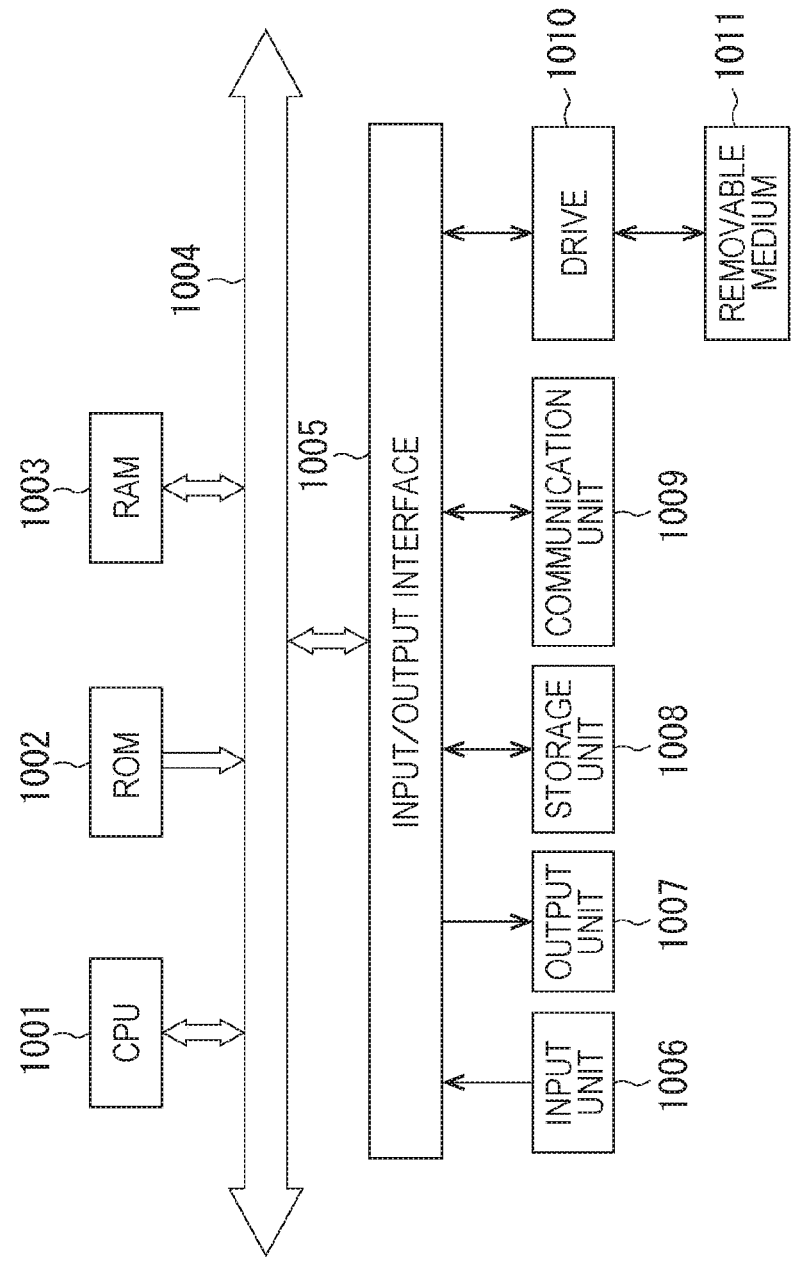
FIG. 22 is a block diagram illustrating an exemplary configuration of a computer.

FIG. 22 is a block diagram illustrating an exemplary configuration of hardware of a computer that executes the series of processing described above by a program.

The CPU 1001, the ROM 1002, and the RAM 1003 are mutually connected by a bus 1004.

The bus 1004 is further connected with an input/output interface 1005. The input/output interface 1005 is connected with an input unit 1006 including a keyboard, a mouse, and the like, and with an output unit 1007 including a display, a speaker, and the like. Moreover, the input/output interface 1005 is connected with a storage unit 1008 including a hard disk, a nonvolatile memory, and the like, a communication unit 1009 including a network interface and the like, and a drive 1010 for driving a removable medium 1011.

On the computer configured as above, the series of above-described processing is executed by operation such that the CPU 1001 loads, for example, a program stored in the storage unit 1008 onto the RAM 1003 via the input/output interface 1005 and the bus 1004 and executes the program.

The program executed by the CPU 1001 is provided in a state of being recorded in the removable medium 1011 or provided via a wired or wireless transmission medium such as a local area network, the Internet, or a digital broadcast, for example, and installed in the storage unit 1008.

Note that the program executed by the computer may be a program processed in a time series in an order described in the present description, or can be a program processed in required timing such as being called.

Note that, in the present description, the system represents a set of multiple constituents (apparatuses, modules (parts), or the like). In other words, all the constituents may be in a same housing but they do not have to be in the same housing. Accordingly, a plurality of apparatuses, housed in separate housings, connected via a network can be a system. An apparatus in which a plurality of modules is housed in one housing can also be a system.

Embodiments of the present technology are not limited to the above-described embodiments but can be modified in a variety of ways within a scope of the present technology.

For example, the present technology can be configured as a form of cloud computing in which one function is shared in cooperation for processing among a plurality of apparatuses via a network.

Moreover, each of steps described in the above flowcharts can be executed on one apparatus or shared by a plurality of apparatuses for processing.

Furthermore, in a case where one step includes a plurality of stages of processing, the plurality of stages of processing included in the one step can be executed on one apparatus or can be shared by a plurality of apparatuses.

<5-4. Configuration Combination Example of >

The present technology can be configured as follows.

(1)

An information processing apparatus including:

a generation unit configured to generate index information including entire information and individual information, the entire information being information related to an entire recording medium as a recording destination of content including at least video data, the entire information including at least any of information related to resolution of video of the content recorded in the recording medium, information related to a codec, and information related to a luminance range, the individual information being information related to each of pieces of content recorded in the recording medium, the individual information including at least any of information related to resolution of video, information related to a codec, and information related to a luminance range; and a recording control unit that controls to record content as a recording target and the index information onto the recording medium.

(2)

The information processing apparatus according to (1), in which the generation unit generates information indicating whether at least one piece of content including video with resolution higher than HD is recorded in the recording medium as the information related to resolution included in the entire information, and generates information indicating whether the content is content including video with resolution higher than HD as the information related to resolution included in the individual information.

(3)

The information processing apparatus according to (1) or (2), in which the generation unit generates information indicating whether at least one piece of content including video coded with a predetermined codec is recorded in the recording medium as the information related to a codec included in the entire information, and generates information indicating whether the content is content including video coded with a predetermined codec as the information related to a codec included in the individual information.

(4)

The information processing apparatus according to any of (1) to (3), in which the generation unit generates information indicating whether at least one piece of HDR content is recorded in the recording medium as the information related to a luminance range included in the entire information, and generates information indicating one type of HDR video as the information related to a luminance range included in the individual information.

(5)

The information processing apparatus according to any of (1) to (4), in which the generation unit deletes the individual information related to predetermined content recorded in the recording medium and rewrites the entire information, in accordance with erasing of the predetermined content.

(6)

The information processing apparatus according to (5), in which the generation unit rewrites the information related to resolution of video included in the entire information in a case where content including video having the same resolution as the predetermined content does not exist in the recording medium, rewrites the information related to a codec included in the entire information in a case where content including video coded with the same codec as the predetermined content does not exist in the recording medium, and rewrites the information related to a luminance range included in the entire information in a case where content including HDR video of the same type as the predetermined content does not exist in the recording medium.

(7)

An information processing method including:

generating index information including entire information and individual information, the entire information being information related to an entire recording medium as a recording destination of content including at least video data, the entire information including at least any of information related to resolution of video of the content recorded in the recording medium, information related to a codec, and information related to a luminance range, the individual information being information related to each of pieces of content recorded in the recording medium, the individual information including at least any of information related to resolution of video, information related to a codec, and information related to a luminance range; and controlling to record content as a recording target and the index information onto the recording medium.

(8)

A program that causes a computer to execute processing including:

generating index information including entire information and individual information, the entire information being information related to an entire recording medium as a recording destination of content including at least video data, the entire information including at least any of information related to resolution of video of the content recorded in the recording medium, information related to a codec, and information related to a luminance range, the individual information being information related to each of pieces of content recorded in the recording medium, the individual information including at least any of information related to resolution of video, information related to a codec, and information related to a luminance range; and controlling to record content as a recording target and the index information onto the recording medium.

(9)

An information processing apparatus including:

a reading unit configured to read, from a recording medium in which content including at least video data is recorded, index information including entire information and individual information, the entire information being information related to an entire recording medium, the entire information including at least any of information related to resolution of video of the content recorded in the recording medium, information related to a codec, and information related to a luminance range, the individual information being information related to each of pieces of content recorded in the recording medium, the individual information including at least any of information related to resolution of video, information related to a codec, and information related to a luminance range; and a display control unit that displays information indicating that content including video that cannot be displayed in original image quality on a display apparatus as a content output destination is recorded in the recording medium on the basis of the entire information, and displays information indicating an attribute of each of pieces of content recorded in the recording medium on the basis of the individual information.

(10)

The information processing apparatus according to (9), in which the display control unit displays the information indicating that content including video that cannot be displayed in original image quality is recorded in the recording medium in a case where the content recorded in the recording medium includes one or more of: content including video with resolution that cannot be displayed on the display apparatus; content including video coded with a codec that cannot be decoded; and content including video having a luminance range that cannot be displayed on the display apparatus.

(11)

An information processing method including:

reading, from a recording medium in which content including at least video data is recorded, index information including entire information and individual information, the entire information being information related to an entire recording medium, the entire information including at least any of information related to resolution of video of the content recorded in the recording medium, information related to a codec, and information related to a luminance range, the individual information being information related to each of pieces of content recorded in the recording medium, the individual information including at least any of information related to resolution of video, information related to a codec, and information related to a luminance range;

displaying information indicating that content including video that cannot be displayed in original image quality on a display apparatus as a content output destination is recorded in the recording medium on the basis of the entire information; and displaying information indicating an attribute of each of pieces of content recorded in the recording medium on the basis of the individual information.

(12)

A program that causes a computer to execute processing including:

reading, from a recording medium in which content including at least video data is recorded, index information including entire information and individual information, the entire information being information related to an entire recording medium, the entire information including at least any of information related to resolution of video of the content recorded in the recording medium, information related to a codec, and information related to a luminance range, the individual information being information related to each of pieces of content recorded in the recording medium, the individual information including at least any of information related to resolution of video, information related to a codec, and information related to a luminance range;

displaying information indicating that content including video that cannot be displayed in original image quality on a display apparatus as a content output destination is recorded in the recording medium on the basis of the entire information; and displaying information indicating an attribute of each of pieces of content recorded in the recording medium on the basis of the individual information.

REFERENCE SIGNS LIST

1 Recording apparatus
2 Reproducing apparatus
3 Recording medium
41 Acquisition unit
42 INDEX file generation unit
43 Recording control unit
44 Display control unit
91 Reading unit
92 INDEX file analysis unit
93 Display control unit

The invention claimed is:

1. An information processing apparatus, comprising:
circuitry configured to:
authenticate a recording medium based on a specific content protection standard, wherein
the recording medium is a recording destination for a plurality of pieces of content, and
the plurality of pieces of content include at least video data;
generate an encryption key, for encryption of the plurality of pieces of content, based on the authentication;
a generation unit configured to generate index information associated with the plurality of pieces of content, wherein the index information includes entire information and individual information,
the entire information is related to the recording medium,
the entire information includes at least one of information related to resolution of video in the plurality of pieces of content, information related to a codec, or information related to a luminance range,
the individual information is information specific to each piece of content of the plurality of pieces of content, and
the individual information includes at least one of information related to resolution of video, information related to a codec, or information related to a luminance range related to each of the plurality of pieces of content; and
a recording control unit configured to record the plurality of pieces of content and the index information onto the recording medium based on the generated encryption key.

2. The information processing apparatus according to claim 1, wherein the generation unit is further configured to:
generate information indicating whether at least one piece of content of the plurality of pieces of content is a video with resolution higher than a High definition (HD) video, wherein the generated information is included in the entire information, and
generate information indicating whether a specific piece of content of the plurality of pieces of content, is a video with resolution higher than the HD video, wherein the generated information is included in the individual information of the specific piece of content.

3. The information processing apparatus according to claim 1, wherein the generation unit is further configured to:
generate information indicating whether at least one piece of content of the plurality of pieces of content is a video coded with a specific codec, wherein the generated information is in the entire information, and
generate information indicating whether a specific piece of content of the plurality of pieces of content is a video coded with a specific codec, wherein the generated information is included in the individual information of the specific piece of content.

4. The information processing apparatus according to claim 1, wherein the generation unit is further configured to:
generate information indicating whether at least one piece of content of the plurality of pieces of content is a high dynamic range (HDRI content, wherein the generated information is included in the entire information as a luminance range of the HDR content, and
generate information indicating whether a specific piece of content of the plurality of pieces of content, is one type of HDR video, wherein the generated information is included as in the individual information of the specific piece of content, as a luminance range of the one type of HDR video.

5. The information processing apparatus according to claim 1, wherein the generation unit is further configured to:
select a specific piece of content, from the plurality of pieces of content for erasure, based on a user selection;
determine the specific piece of content is referenced by at least one piece of content from the plurality of pieces of content;
disable deletion of the specific piece of content based on a result of the determination;

delete the individual information related to the specific piece of content recorded in the recording medium; and
rewrite the entire information in the recording medium, based on the deletion of of the individual information associated with the specific piece of content.

6. The information processing apparatus according to claim 5, wherein the generation unit is further configured to:
rewrite first information related to resolution of video included in the entire information based on a video, with a same resolution as the specific piece of content, that is absent in the recording medium,
rewrite second information related to a codec included in the entire information based on a video, coded with a same codec as the specific piece of content, that is absent in the recording medium, and
rewrite third information related to a luminance range included in the entire information based on an HDR video, of a same type as the specific piece of content, that is absent in the recording medium.

7. An information processing method, comprising:
authenticating a recording medium based on a specific content protection standard, wherein
the recording medium is a recording destination for a plurality of pieces of content, and
the plurality of pieces of content include at least video data;
generating an encryption key, for encryption of the plurality of pieces of content, based on the authentication;
generating index information associated with the plurality of pieces of content,
wherein
the index information includes entire information and individual information,
the entire information is related to the recording medium,
the entire information includes at least one of information related to resolution of video in the plurality of pieces of content, information related to a codec, or information related to a luminance range,
the individual information is information specific to each piece of content of the plurality of pieces of content, and
the individual information includes at least one of information related to resolution of video, information related to a codec, or information related to a luminance range; and
recording the plurality of pieces of content and the index information onto the recording medium based on the generated encryption key.

8. A non-transitory computer-readable medium having stored thereon computer-executable instructions that, when executed by a processor, cause the processor to execute operations, the operations comprising:
authenticating a recording medium based on a specific content protection standard, wherein
the recording medium is a recording destination for a plurality of pieces of content, and
the plurality of pieces of content include at least video data;
generating an encryption key, for encryption of the plurality of pieces of content, based on the authentication;
generating index information associated with the plurality of pieces of content,
wherein
the index information includes entire information and individual information,
the entire information is related to the recording medium,
the entire information includes at least one of information related to resolution of video in the plurality of pieces of content, information related to a codec, or information related to a luminance range,
the individual information is information specific to each piece of content of the plurality of pieces of content, and
the individual information includes at least one of information related to resolution of video, information related to a codec, or information related to a luminance range; and
recording the plurality of pieces of content and the index information onto the recording medium based on the generated encryption key.

9. An information processing apparatus, comprising:
circuitry configured to:
authenticate a recording medium based on a specific content protection standard, wherein
the recording medium includes a plurality of pieces of content, and
the plurality of pieces of content include at least video data;
extract a decryption key from a protected region of the recording medium, based on the authentication;
a reading unit configured to read, from the recording medium, index information associated with the plurality of pieces of content, based on the extracted decryption key, wherein
the index information includes entire information and individual information,
the entire information is related to the recording medium, the entire information includes at least one of information related to resolution of video in the plurality of pieces of content, information related to a codec, or information related to a luminance range,
the individual information is information specific to each piece of content of the plurality of pieces of content, and
the individual information includes at least one of information related to resolution of video, information related to a codec, and information related to a luminance range; and
a display control unit configured to:
display information, indicating that a specific piece of content of the plurality of pieces of content video is not displayable in original image quality on a display apparatus, based on the entire information, and
display information, indicating an attribute of each of the plurality of pieces of content, based on the individual information.

10. The information processing apparatus according to claim 9, wherein the display control unit is configured to:
display the information, indicating that the specific piece of content is not displayable in original image quality, based on the specific piece of content that includes at least one of:
video content with resolution that is not displayable on the display apparatus,
video coded with a codec that is not decodable by the display apparatus, or
video with a luminance range that is not displayable on the display apparatus.

11. An information processing method, comprising:
authenticating a recording medium based on a specific content protection standard, wherein the recording medium includes a plurality of pieces of content, and
the plurality of pieces of content include at least video data;

extracting a decryption key from a protected region of the recording medium based on the authentication;

reading, from the recording medium, index information associated with the plurality of pieces of content, based on the extracted decryption key, wherein
the index information includes entire information and individual information based on the extracted decryption key,
the entire information is related to the recording medium, the entire information includes at least one of information related to resolution of video in the plurality of pieces of content, information related to a codec, or information related to a luminance range,
the individual information is information specific to each piece of content of the plurality of pieces of content, and
the individual information includes at least one of information related to resolution of video, information related to a codec, or information related to a luminance range;

displaying information, indicating that a specific piece of content of the plurality of pieces of content is not displayable in original image quality on a display apparatus, based on the entire information; and displaying information, indicating an attribute of each of the plurality of pieces of content recorded in the recording medium, based on the individual information.

12. A non-transitory computer-readable medium having stored thereon computer-executable instructions that, when executed by a processor, cause the processor to execute operations, the operations comprising:

authenticating a recording medium based on a specific content protection standard, wherein
the recording medium includes a plurality of pieces of content, and
the plurality of pieces of content include at least video data;

extracting a decryption key from a protected region of the recording medium based on the authentication;

reading, from the recording medium, index information associated with the plurality of pieces of content, based on the extracted decryption key, wherein
the index information includes entire information and individual information based on the extracted decryption key,
the entire information is related to the recording medium, the entire information includes at least one of information related to resolution of video in the plurality of pieces of content, information related to a codec, or information related to a luminance range,
the individual information is information specific to each piece of content of the plurality of pieces of content, and
the individual information includes at least one of information related to resolution of video, information related to a codec, and information related to a luminance range;

displaying information, indicating that a specific piece of content of the plurality of pieces of content is not displayable in original image quality on a display apparatus, based on the entire information; and displaying information, indicating an attribute of each of the plurality of pieces of content recorded in the recording medium, based on the individual information.

* * * * *